(12) United States Patent
Fu et al.

(10) Patent No.: US 12,019,865 B2
(45) Date of Patent: Jun. 25, 2024

(54) METHOD FOR QUICKLY ENTERING APPLICATION AND ELECTRONIC DEVICE HAVING FOLDABLE SCREEN

(71) Applicant: Huawei Technologies Co., Ltd., Shenzhen (CN)

(72) Inventors: Ao Fu, Shanghai (CN); Wenji An, Shanghai (CN); Honglei Luo, Shanghai (CN); Chongting Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/761,860

(22) PCT Filed: Sep. 8, 2020

(86) PCT No.: PCT/CN2020/114090
§ 371 (c)(1),
(2) Date: Mar. 18, 2022

(87) PCT Pub. No.: WO2021/052223
PCT Pub. Date: Mar. 25, 2021

(65) Prior Publication Data
US 2022/0365675 A1    Nov. 17, 2022

(30) Foreign Application Priority Data
Sep. 18, 2019   (CN) .......................... 201910882966.5

(51) Int. Cl.
*G06F 3/04886*    (2022.01)
*G06F 1/16*    (2006.01)
*H04M 1/72469*    (2021.01)

(52) U.S. Cl.
CPC ........ *G06F 3/04886* (2013.01); *G06F 1/1641* (2013.01); *G06F 1/1677* (2013.01);
(Continued)

(58) Field of Classification Search
CPC .. G06F 3/04886; G06F 1/1641; G06F 1/1677; G06F 1/1686; G06F 2203/04803; H04M 1/72469
See application file for complete search history.

(56) References Cited

U.S. PATENT DOCUMENTS

2010/0302179 A1    12/2010   Ahn et al.
2016/0184700 A1    6/2016    Lee et al.
(Continued)

FOREIGN PATENT DOCUMENTS

CN    103701983 A    4/2014
CN    102937863 B    4/2017
(Continued)

*Primary Examiner* — Sherrod L Keaton
(74) *Attorney, Agent, or Firm* — Conley Rose, P.C.

(57) ABSTRACT

A method for quickly entering an application includes detecting a first operation, where the first operation is used to change the electronic device from the folded form to an unfolded form, wherein when the electronic device is in the unfolded form, the included angle between the first region and the second region is greater than a second preset angle, and wherein the second preset angle is greater than the first preset angle, and displaying display interfaces of one or more preset applications in the first region, the second region, and/or the third region in response to the first operation. In the method, when the electronic device changes from the folded form to the unfolded form, a preset application may be quickly entered.

21 Claims, 30 Drawing Sheets

(52) U.S. Cl.
CPC ...... *G06F 1/1686* (2013.01); *H04M 1/72469* (2021.01); *G06F 2203/04803* (2013.01)

(56) References Cited

U.S. PATENT DOCUMENTS

| | | | | |
|---|---|---|---|---|
| 2016/0381014 | A1* | 12/2016 | Kim | G06F 1/1652 |
| | | | | 726/7 |
| 2017/0221456 | A1* | 8/2017 | Kim | G06F 1/1641 |
| 2018/0039250 | A1* | 2/2018 | Liang | G06F 1/1681 |
| 2018/0129459 | A1* | 5/2018 | Sylvan | G06F 3/1423 |
| 2018/0374411 | A1* | 12/2018 | Yang | G06F 3/0488 |
| 2020/0175945 | A1 | 6/2020 | Chen et al. | |
| 2020/0192529 | A1* | 6/2020 | Li | G06F 3/04817 |
| 2022/0222027 | A1 | 7/2022 | Zhang | |

FOREIGN PATENT DOCUMENTS

| | | | |
|---|---|---|---|
| CN | 107103840 | A | 8/2017 |
| CN | 107678724 | A | 2/2018 |
| CN | 107728901 | A | 2/2018 |
| CN | 107741786 | A | 2/2018 |
| CN | 107765971 | A | 3/2018 |
| CN | 107807760 | A | 3/2018 |
| CN | 107809504 | A | 3/2018 |
| CN | 107870716 | A | 4/2018 |
| CN | 107888769 | A | 4/2018 |
| CN | 108153422 | A | 6/2018 |
| CN | 108196922 | A | 6/2018 |
| CN | 109743437 | A | 5/2019 |
| CN | 109918165 | A | 6/2019 |
| CN | 109947508 | A | 6/2019 |
| CN | 110119295 | A | 8/2019 |
| CN | 110225154 | A | 9/2019 |
| KR | 20190001389 | A | 1/2019 |
| WO | 2018191900 | A1 | 10/2018 |

* cited by examiner

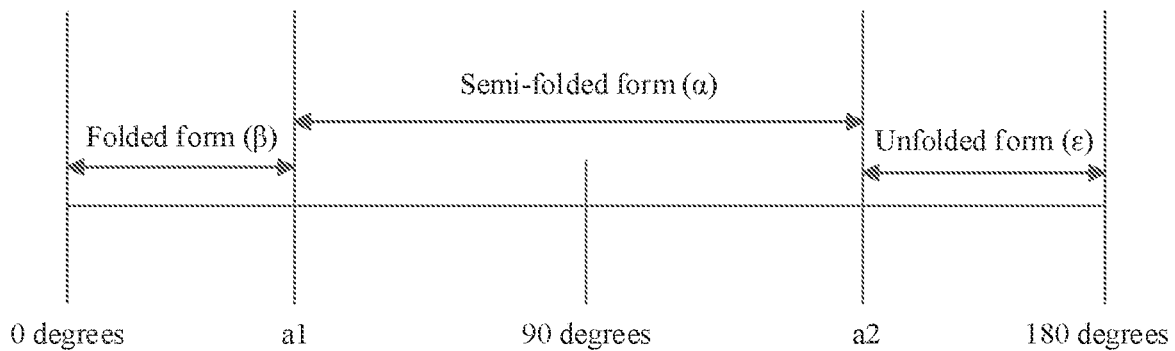
FIG. 4
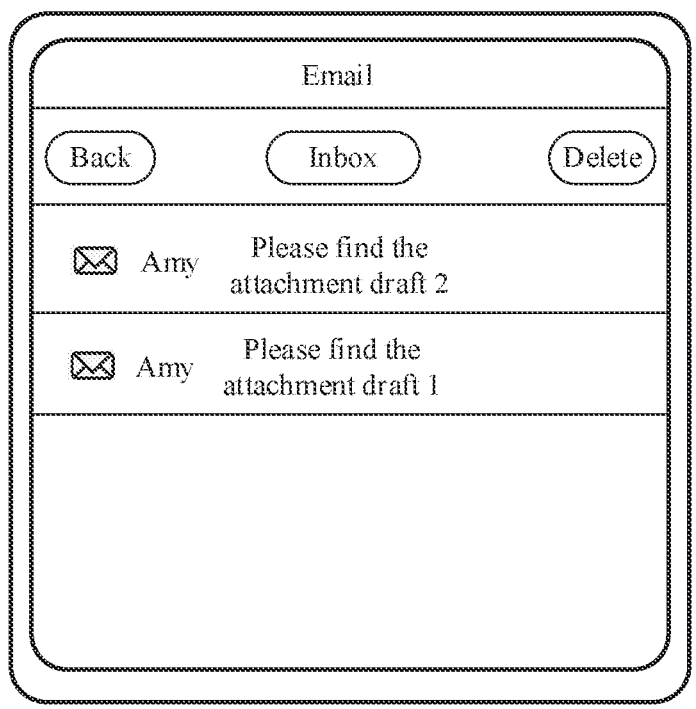
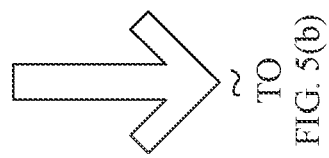
FIG. 5(a)

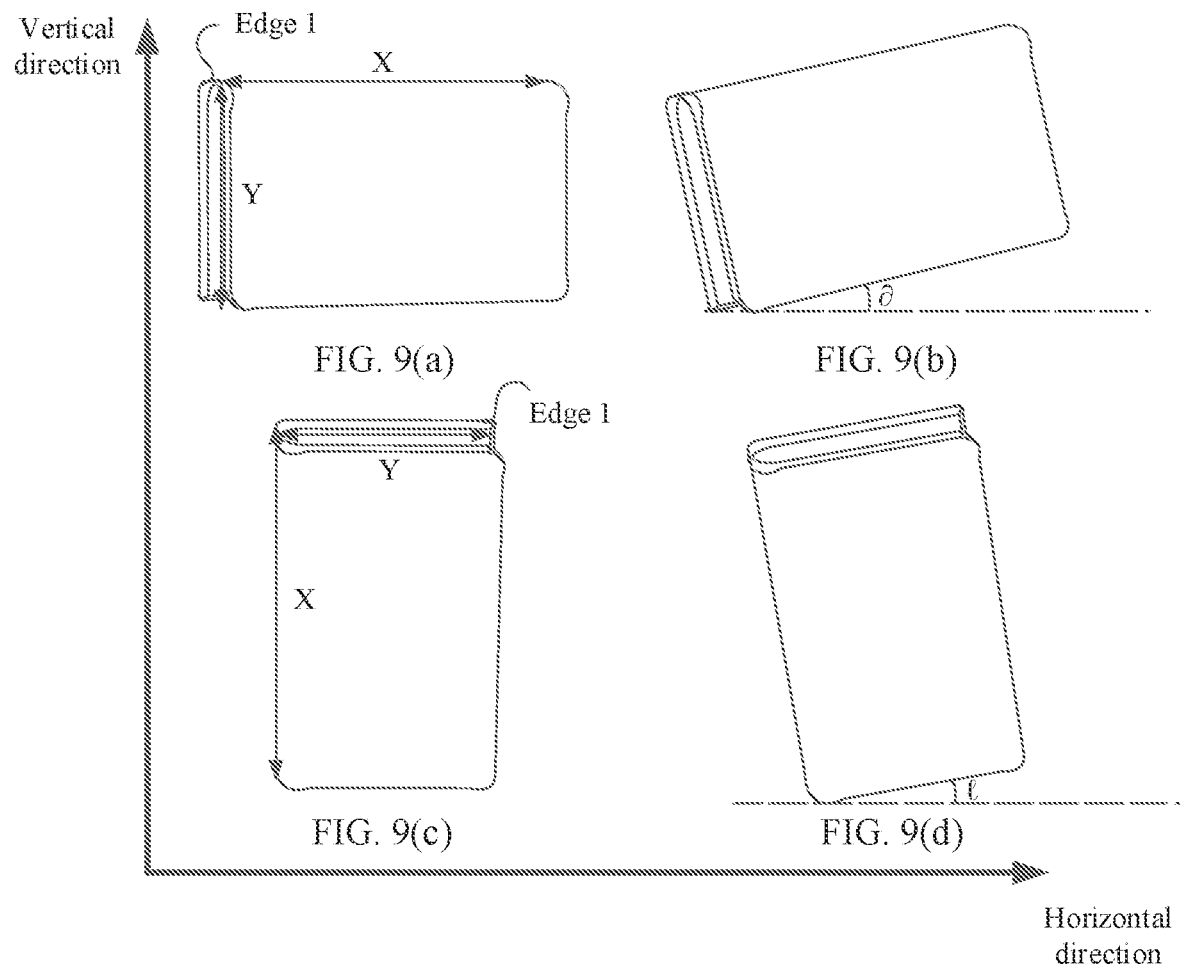

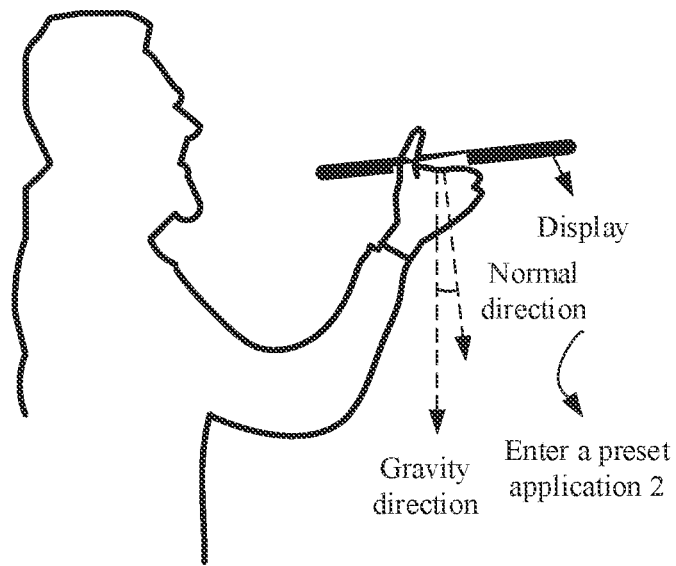

FIG. 14(d)

An electronic device detects a first operation, where the first operation is used to change the electronic device from a folded form to an unfolded form, and when the electronic device is in the unfolded form, an included angle between a first region and a second region is greater than a second preset angle, and the second preset angle is greater than a first preset angle — 1501

The electronic device displays display interfaces of one or more preset applications in the first region, and/or the second region, and/or a third region in response to detecting the first operation — 1502

FIG. 15

METHOD FOR QUICKLY ENTERING APPLICATION AND ELECTRONIC DEVICE HAVING FOLDABLE SCREEN

CROSS-REFERENCE TO RELATED APPLICATIONS

This is a U.S. National Stage of International Patent Application No. PCT/CN2020/114090 filed on Sep. 8, 2020, which claims priority to Chinese Patent Application No. 201910882966.5 filed on Sep. 18, 2019. Both of the aforementioned applications are hereby incorporated by reference in their entireties.

TECHNICAL FIELD

This application relates to the field of terminal technologies, and in particular, to a method for quickly entering an application and an electronic device having a foldable screen.

BACKGROUND

With popularization of mobile devices such as mobile phones, people have an increasingly strong demand for large-screen mobile phones. However, application of the large-screen mobile phones brings a problem of portability. To improve portability, a foldable phone having a stretchable screen becomes a mobile phone development trend. For the foldable phone, the screen is a large screen when the screen is in an unfolded form, and the large screen can provide a user with better visual experience. When the screen is in a folded form, it is convenient for the user to carry the phone.

When the user needs to use the foldable phone, the user may unfold the foldable phone from the folded form to the unfolded form. As shown in FIG. 1(a), an electronic device is in a folded form. After the electronic device is unfolded, a home screen is displayed, as shown in FIG. 1(b). The user needs to select an icon of a to-be-opened application from a plurality of application icons, and then tap the icon to enter the application. The operations are relatively complex.

SUMMARY

This application provides a method for quickly entering an application and an electronic device having a foldable screen. In the method, when the electronic device having a foldable screen changes from a folded form to an unfolded form, a preset application may be quickly entered. An operation is simple, thereby helping improve user experience.

According to a first aspect, an embodiment of this application provides a method for quickly entering an application. The method may be applied to an electronic device having a foldable screen for implementation, or implemented by a chip. The foldable screen includes a first region, a second region, and a third region. When the electronic device is in a folded form, an included angle between the first region and the second region is less than a first preset angle, and the first region and the second region are respectively on two sides of the third region. The method includes: The electronic device detects a first operation, where the first operation is used to change the electronic device from the folded form to an unfolded form, and when the electronic device is in the unfolded form, the included angle between the first region and the second region is greater than a second preset angle, and the second preset angle is greater than the first preset angle; and the electronic device displays display interfaces of one or more preset applications in the first region, and/or the second region, and/or the third region in response to detecting the first operation.

It should be understood that, in the method provided in this application, when the electronic device having a foldable screen changes from the folded form to the unfolded form, the preset application may be quickly entered. The operation is simple, thereby helping improve user experience.

In a possible design, the one or more preset applications are one or more applications specified by a user, or one or more applications that are most frequently used within preset duration, or one or more applications that are last run or displayed before the electronic device is folded into the folded form, or one or more applications corresponding to a new message received when the electronic device is in the folded form.

It should be understood that the foregoing several examples are merely examples of the preset applications, but do not constitute a limitation. Therefore, this application can implement that, when the electronic device having a foldable screen changes from the folded form to the unfolded form, the preset application may be quickly entered. The operation is simple, thereby helping improve user experience.

In a possible design, that the electronic device detects a first operation includes: The electronic device detects a first unfolding operation, where the first unfolding operation is used to change the electronic device from a landscape-folded form to a landscape-unfolded form.

It should be understood that, in the method provided in this application, when the electronic device having a foldable screen changes from the landscape-folded form to the landscape-unfolded form, the preset application may be quickly entered. The operation is simple, thereby helping improve user experience.

In a possible design, if the electronic device detects a second unfolding operation, where the second unfolding operation is used to change the electronic device from a portrait-folded form to a portrait-unfolded form, the electronic device displays a home screen in the first region, and/or the second region, and/or the third region in response to the second unfolding operation.

It should be understood that, in the method provided in this application, when the electronic device having a foldable screen changes from the landscape-folded form to the landscape-unfolded form, the preset application may be quickly entered, and when the electronic device changes from the portrait-folded form to the portrait-unfolded form, the home screen may be displayed. The design is flexible and the operation is simple, thereby helping improve user experience.

In a possible design, that the electronic device displays display interfaces of one or more preset applications in the first region, and/or the second region, and/or the third region in response to detecting the first operation includes: The electronic device captures an image by using a front-facing camera on the electronic device in response to detecting the first operation; if the image includes a face, determines a line between a point on the face and an edge point on the electronic device, and determines an included angle between the line and a first edge, where the first edge is an edge on which the edge point is located; and if the included angle is greater than a third preset angle, displays the display interfaces of the one or more preset applications in the first region, and/or the second region, and/or the third region.

It should be understood that, in the method provided in this application, when the electronic device having a foldable screen changes from the folded form to the unfolded form, if a specific condition is met (the included angle between the line between the point on the face captured by the camera and the edge point on the electronic device and the first edge meets the condition), the preset application may be quickly entered. The operation is simple, thereby helping improve user experience.

In a possible design, if the included angle is less than a fourth preset angle, the home screen is displayed. The third preset angle is greater than the fourth preset angle.

It should be understood that, in the method provided in this application, when the electronic device having a foldable screen changes from the folded form to the unfolded form, if the included angle between the line between the point on the face captured by the camera and the edge point on the electronic device and the first edge meets the condition, the preset application may be quickly entered. Alternatively, if the included angle does not meet the condition, the home screen is entered. The design is flexible and the operation is simple, thereby helping improve user experience.

In a possible design, that the electronic device displays display interfaces of one or more preset applications in the first region, and/or the second region, and/or the third region in response to detecting the first operation includes: In response to detecting the first operation and determining that an included angle between a normal direction and a gravity direction of the foldable screen is less than a third preset angle, the electronic device displays the display interfaces of the one or more preset applications in the first region, and/or the second region, and/or the third region.

It should be understood that, in the method provided in this application, when the electronic device having a foldable screen changes from the folded form to the unfolded form, if a specific condition is met (the included angle between the normal direction and the gravity direction of the foldable screen is less than the third preset angle), the preset application may be quickly entered. The operation is simple, thereby helping improve user experience.

In a possible design, if the electronic device determines that the included angle between the normal direction and the gravity direction of the foldable screen is greater than a fourth preset angle, the home screen is displayed. The third preset angle is less than the fourth preset angle.

It should be understood that, in the method provided in this application, when the electronic device having a foldable screen changes from the folded form to the unfolded form, if the specific condition is met (the included angle between the normal direction and the gravity direction of the foldable screen is less than the third preset angle), the preset application may be quickly entered. Alternatively, if the included angle is greater than the fourth preset angle, a second preset application or the home screen is displayed. The design is flexible and the operation is simple, thereby helping improve user experience.

In a possible design, that the electronic device displays display interfaces of one or more preset applications in the first region, and/or the second region, and/or the third region in response to detecting the first operation includes: The electronic device displays the display interfaces of the one or more preset applications in full screen in the first region, and/or the second region, and/or the third region in response to the first operation; or the electronic device enters a split-screen mode in response to the first operation, where in the split-screen mode, the home screen is displayed in a first display region on the foldable screen, and the display interfaces of the one or more preset applications are displayed in a second display region.

It should be understood that, in the method provided in this application, when the electronic device having a foldable screen changes from the folded form to the unfolded form, the preset application may be entered in full screen, or the preset application and the home screen may be displayed on split screens, to facilitate a user operation.

In a possible design, that the electronic device displays display interfaces of one or more preset applications in the first region, and/or the second region, and/or the third region in response to detecting the first operation includes: The electronic device displays icons of the one or more preset applications in the first region, and/or the second region, and/or the third region in response to the first operation; and the electronic device displays a display interface of a preset application corresponding to a first icon in full screen in response to detecting a second operation performed on the first icon.

It should be understood that, in the method provided in this application, when the electronic device having a foldable screen changes from the folded form to the unfolded form, the icons of the one or more preset applications may be displayed, and the user may tap an icon of a preset application to open a display interface of the preset application. This facilitates the user operation.

According to a second aspect, an embodiment of this application provides an electronic device having a foldable screen and a function of quickly entering an application. The foldable screen includes a first region, a second region, and a third region. When the electronic device is in a folded form, an included angle between the first region and the second region is less than a first preset angle, and the first region and the second region are respectively on two sides of the third region. The electronic device includes one or more processors, a memory, a plurality of applications, and one or more computer programs. The one or more computer programs are stored in the memory, the one or more computer programs includes instructions, and when the instructions are executed by the electronic device, the electronic device is enabled to perform the following steps:

detecting a first operation, where the first operation is used to change the electronic device from the folded form to an unfolded form, and when the electronic device is in the unfolded form, the included angle between the first region and the second region is greater than a second preset angle, and the second preset angle is greater than the first preset angle, and displaying display interfaces of one or more preset applications in the first region, and/or the second region, and/or the third region in response to detecting the first operation.

In a possible design, the one or more preset applications are one or more applications specified by a user, or one or more applications that are most frequently used within preset duration, or one or more applications that are last run or displayed before the electronic device is folded into the folded form, or one or more applications corresponding to a new message received when the electronic device is in the folded form.

In a possible design, when the instructions are executed by the electronic device, the electronic device is enabled to specifically perform the following step; detecting a first unfolding operation, where the first unfolding operation is used to change the electronic device from a landscape-folded form to a landscape-unfolded form.

In a possible design, when the instructions are executed by the electronic device, the electronic device is enabled to further perform the following step; if a second unfolding operation is detected, where the second unfolding operation is used to change the electronic device from a portrait-folded form to a portrait-unfolded form, displaying a home screen in the first region, and/or the second region, and/or the third region in response to the second unfolding operation.

In a possible design, when the instructions are executed by the electronic device, the electronic device is enabled to specifically perform the following steps: capturing an image by using a front-facing camera on the electronic device in response to detecting the first operation; if the image includes a face, determining a line between a point on the face and an edge point on the electronic device, and determining an included angle between the line and a first edge, where the first edge is an edge on which the edge point is located; and if the included angle is greater than a third preset angle, displaying the display interfaces of the one or more preset applications in the first region, and/or the second region, and/or the third region.

In a possible design, when the instructions are executed by the electronic device, the electronic device is enabled to further perform the following step; if the included angle is less than a fourth preset angle, displaying the home screen, where the third preset angle is greater than the fourth preset angle.

In a possible design, when the instructions are executed by the electronic device, the electronic device is enabled to specifically perform the following step; in response to detecting the first operation and determining that an included angle between a normal direction and a gravity direction of the foldable screen is less than a third preset angle, displaying the display interfaces of the one or more preset applications in the first region, and/or the second region, and/or the third region.

In a possible design, when the instructions are executed by the electronic device, the electronic device is enabled to further perform the following step: if the electronic device determines that the included angle between the normal direction and the gravity direction of the foldable screen is greater than a fourth preset angle, displaying a second preset application or the home screen, where the second preset application is different from the preset application, and the third preset angle is less than the fourth preset angle.

In a possible design, when the instructions are executed by the electronic device, the electronic device is enabled to specifically perform the following step: displaying the display interfaces of the one or more preset applications in full screen in the first region, and/or the second region, and/or the third region in response to the first operation; or entering a split-screen mode in response to the first operation, where in the split-screen mode, the home screen is displayed in a first display region on the foldable screen, and the display interfaces of the one or more preset applications are displayed in a second display region.

In a possible design, when the instructions are executed by the electronic device, the electronic device is enabled to specifically perform the following steps: displaying icons of the one or more preset applications in the first region, and/or the second region, and/or the third region in response to the first operation; and displaying a display interface of a preset application corresponding to a first icon in full screen in response to detecting a second operation performed on the first icon.

According to a third aspect, an embodiment of this application provides a chip. The chip is coupled to a memory in an electronic device, and is configured to invoke a computer program stored in the memory and execute a technical solution according to the first aspect and any possible design of the first aspect in embodiments of this application. In this embodiment of this application, "coupling" means a direct combination or an indirect combination of two components. Specifically, the chip may detect a first operation, where the first operation is used to change the electronic device from a folded form to an unfolded form. When the electronic device is in the unfolded form, an included angle between a first region and a second region is greater than a second preset angle, and the second preset angle is greater than a first preset angle. The chip may further indicate, in response to detecting the first operation, a display to display display interfaces of one or more preset applications in the first region, and/or the second region, and/or a third region.

In a possible design, the one or more preset applications are one or more applications specified by a user, or one or more applications that are most frequently used within preset duration, or one or more applications that are last run or displayed before the electronic device is folded into the folded form, or one or more applications corresponding to a new message received when the electronic device is in the folded form.

In a possible design, that the chip detects the first operation includes: detecting a first unfolding operation, where the first unfolding operation is used to change the electronic device from a landscape-folded form to a landscape-unfolded form.

In a possible design, the chip may further detect a second unfolding operation, where the second unfolding operation is used to change the electronic device from a portrait-folded form to a portrait-unfolded form. The chip indicates, in response to the second unfolding operation, the display to display a home screen in the first region, and/or the second region, and/or the third region.

In a possible design, in response to the first operation, the chip displays the display interfaces of the one or more preset applications in the first region, and/or the second region, and/or the third region includes: The chip captures an image by using a front-facing camera on the electronic device in response to detecting the first operation; if the image includes a face, determines a line between a point on the face and an edge point on the electronic device, and determines an included angle between the line and a first edge, where the first edge is an edge on which the edge point is located; and if the included angle is greater than a third preset angle, indicates the display to display the display interfaces of the one or more preset applications in the first region, and/or the second region, and/or the third region.

In a possible design, if the chip determines that the included angle is less than a fourth preset angle, the chip indicates the display to display the home screen. The third preset angle is greater than the fourth preset angle.

In a possible design, in response to the first operation, the chip displays the display interfaces of the one or more preset applications in the first region, and/or the second region, and/or the third region includes: in response to detecting the first operation and determining that an included angle between a normal direction and a gravity direction of the foldable screen is less than a third preset angle, indicating the display to display the display interfaces of the one or more preset applications in the first region, and/or the second region, and/or the third region.

In a possible design, if the chip determines that the included angle between the normal direction and the gravity direction of the foldable screen is greater than a fourth preset angle, the chip indicates the display to display the home screen. The third preset angle is less than the fourth preset angle.

In a possible design, in response to the first operation, the chip displays the display interfaces of the one or more preset applications in the first region, and/or the second region, and/or the third region includes: indicating, in response to the first operation, the display to display the display interfaces of the one or more preset applications in full screen in the first region, and/or the second region, and/or the third region; or indicating, in response to the first operation, the display to enter a split-screen mode, where in the split-screen mode, the home screen is displayed in a first display region on the foldable screen, and the display interfaces of the one or more preset applications are displayed in a second display region.

In a possible design, in response to the first operation, the chip displays the display interfaces of the one or more preset applications in the first region, and/or the second region, and/or the third region includes: indicating, in response to the first operation, the display to display icons of the one or more preset applications in the first region, and/or the second region, and/or the third region; and indicating, in response to detecting a second operation performed on a first icon, the display to display a display interface of a preset application corresponding to the first icon in full screen.

According to a fourth aspect, an embodiment of this application further provides a circuit system. The circuit system may be one or more chips, for example, a system-on-a-chip (system-on-a-chip, SoC). The circuit system includes at least one processing circuit. The at least one processing circuit is configured to detect a first operation, where the first operation is used to change an electronic device from a folded form to an unfolded form. When the electronic device is in the unfolded form, an included angle between a first region and a second region is greater than a second preset angle, and the second preset angle is greater than a first preset angle. The electronic device displays display interfaces of one or more preset applications in the first region, and/or the second region, and/or a third region in response to detecting the first operation.

According to a fifth aspect, an embodiment of this application further provides an electronic device having a foldable screen and a function of quickly entering an application. The foldable screen includes a first region, a second region, and a third region. When the electronic device is in a folded form, an included angle between the first region and the second region is less than a first preset angle, and the first region and the second region are respectively on two sides of the third region. The electronic device includes modules/units that perform the method according to any one of the first aspect or the possible designs of the first aspect. These modules/units may be implemented by hardware, or may be implemented by hardware executing corresponding software.

According to a sixth aspect, an embodiment of this application further provides a computer-readable storage medium. The computer-readable storage medium includes a computer program. When the computer program is run on an electronic device, the electronic device is enabled to perform the technical solution in any one of the first aspect of embodiments of this application or the possible designs of the first aspect.

According to a seventh aspect, an embodiment of this application provides a program product, including instructions. When the program product runs on an electronic device, the electronic device is enabled to perform the technical solution in any one of the first aspect of embodiments of this application or the possible designs of the first aspect.

BRIEF DESCRIPTION OF DRAWINGS

FIG. 4 is a schematic diagram of a display interface of an electronic device having a foldable screen according to an embodiment of this application;

FIG. 9(a) to FIG. 9(d) are schematic diagrams of an electronic device having a foldable screen in landscape mode and in portrait mode according to an embodiment of this application;

FIG. 15 is a schematic flowchart of a method for quickly entering an application according to an embodiment of this application.

DESCRIPTION OF EMBODIMENTS

Figure 1A:
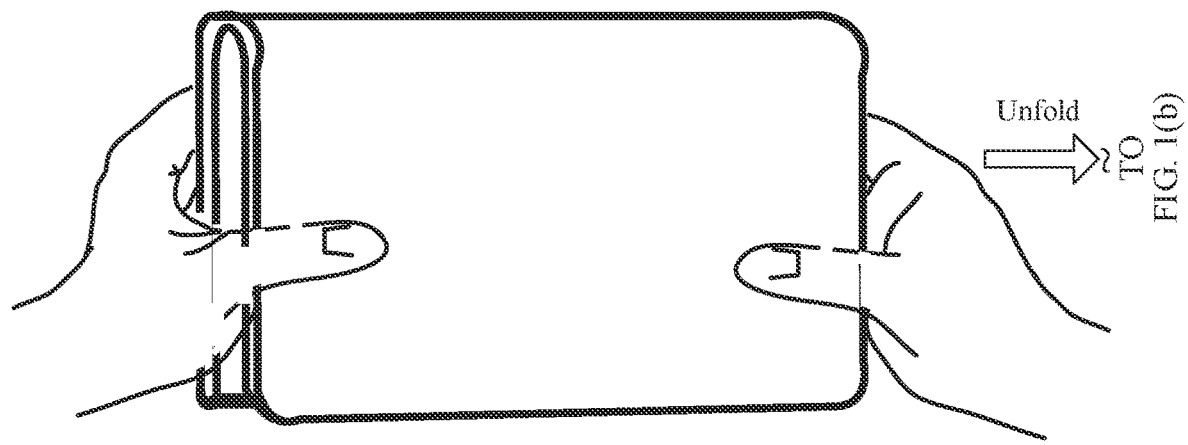
FIG. 1(a) and FIG. 1(b) are a schematic diagram of entering an application when an electronic device having a foldable screen is unfolded in the conventional technology.
Figure 1B:
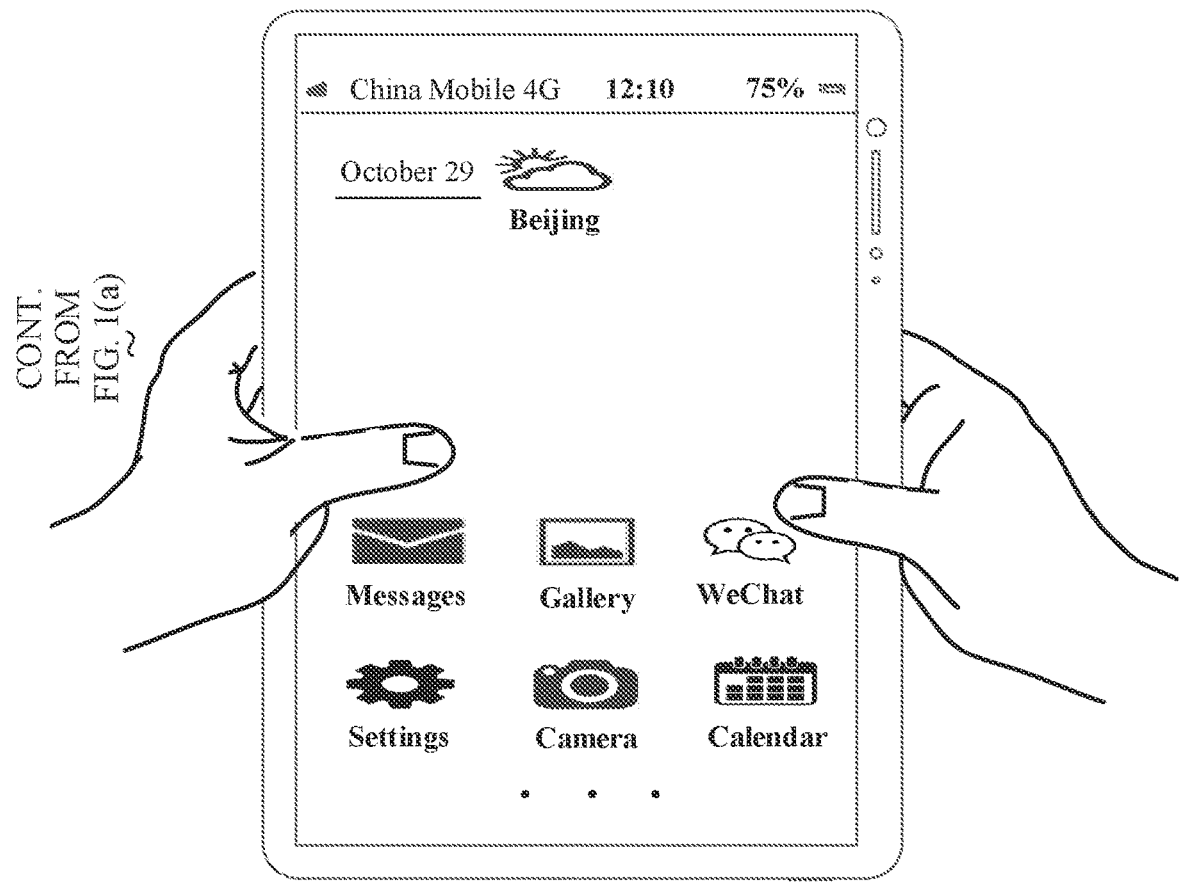

The following describes in detail technical solutions in embodiments of this application with reference to accompanying drawings in the following embodiments of this application.

Terms used in the following embodiments are merely intended to describe specific embodiments, but are not intended to limit this application. As used in the specification and appended claims of this application, the terms "a", "one", "the", "the foregoing", "this", and "the one" of singular forms are intended to also include plural forms, for example, "one or more", unless otherwise clearly specified in the context. It should be further understood that, in embodiments of this application, "one or more" refers to one, two, or more, and the term "and/or" describes an association between associated objects, and indicates that three relationships may exist. For example, A and/or B may indicate the following cases. Only A exists, both A and B exist, and only B exists, where A and B may be singular or plural. The character "I" generally represents an "or" relationship between the associated objects.

Reference to "an embodiment", "some embodiments", or the like described in this specification means that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment. Instead, the statements mean "one or more but not all of the embodiments", unless otherwise specifically emphasized in another manner. The terms "include", "contain", "have", and their variants all mean "include but are not limited to", unless otherwise specifically emphasized.

The following describes some terms in embodiments of this application to help persons skilled in the art have a better understanding.

In embodiments of this application, "at least one" means one or more, and "more" thereof means two or more. In addition, it should be understood that, in descriptions of this application, terms such as "first" and "second" are merely used for distinction and description, cannot be understood as an indication or implication of relative importance, and cannot be understood as an indication or implication of a sequence.

An application (application, app) in embodiments of this application, which may alternatively be referred to as an application program, is a software program that can implement one or more specific functions. Generally, a plurality of applications may be installed on an electronic device, for example, an instant messaging application, a video application, an audio application, an image shooting application. The instant messaging application may include, for example, Messages, WeChat (WeChat), WhatsApp Messenger, Line (Line), Instagram(Instagram), Kakao Talk, and DingTalk. The image shooting application may include, for example, a camera application (a system camera or a third-party camera application). The video application may include, for example, YouTube, Twitter, TikTok, iQIYI, and Tencent Video. The audio application may include, for example, KuGou, Xiami, and QQ Music. An application mentioned in the following embodiments may be an application installed before delivery of the electronic device, or may be an application downloaded from a network or obtained from another electronic device by a user in a process of using the electronic device.

An embodiment of this application provides a method for quickly entering an application. The method is applicable to any foldable electronic device, for example, an electronic device having a foldable screen, such as a mobile phone having a foldable screen (foldable phone for short), or a tablet computer or a notebook computer having a foldable screen. Certainly, the method is also applicable to a wearable device, a vehicle-mounted device, a smart home, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), and the like. The foldable phone is used as an example. In the method for quickly entering an application provided in this embodiment of this application, when the foldable phone changes from a folded form to an unfolded form, a preset application may be directly opened, and a display interface of the application is displayed. A user does not need to select the application from a plurality of applications. This facilitates an operation. In the following embodiments, the foldable phone is mainly used as an example for description.

Figure 2A:
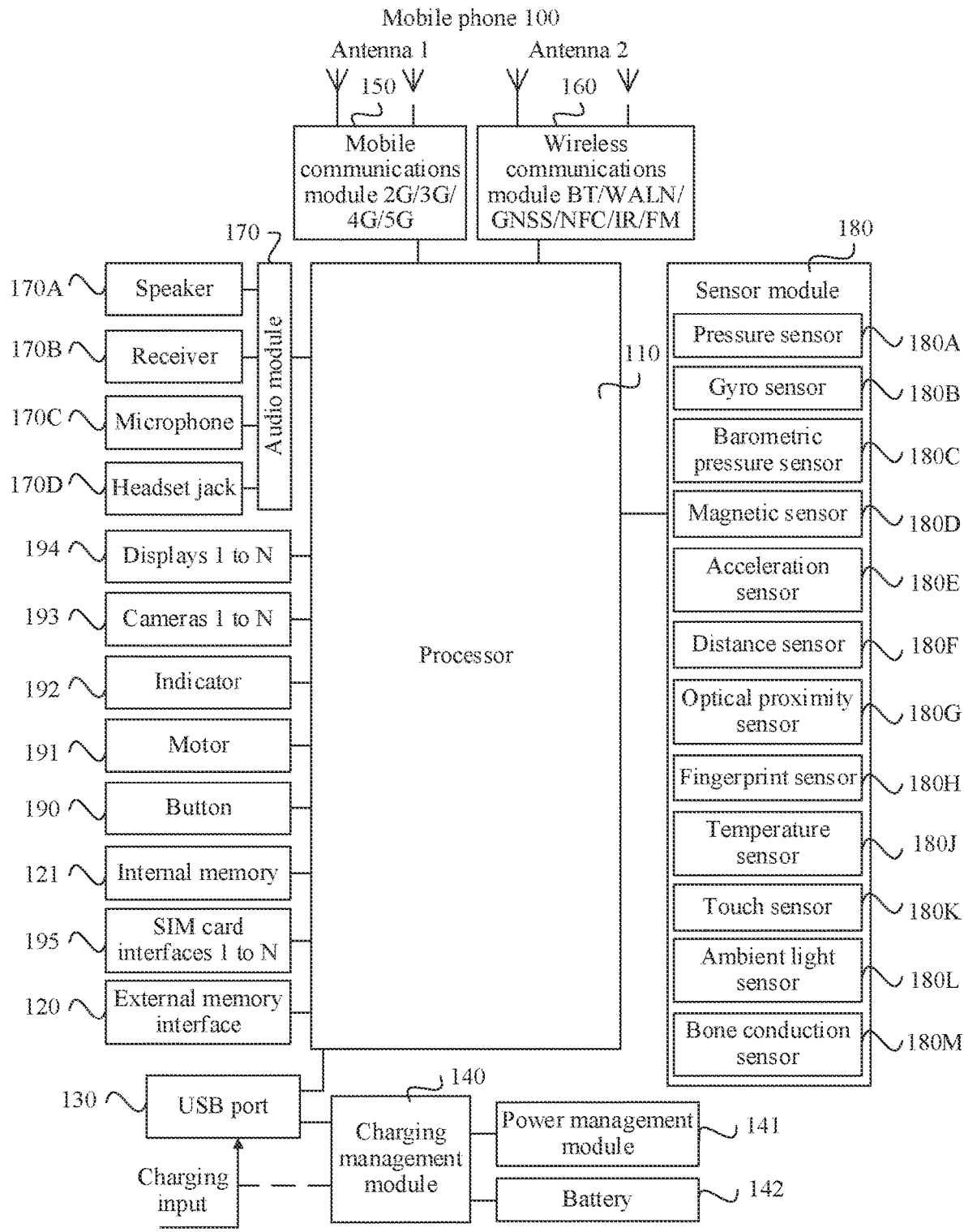
FIG. 2A is a schematic diagram of a hardware structure of an electronic device according to an embodiment of this application.

For example, FIG. 2A is a schematic diagram of a structure of a foldable electronic device, for example, a foldable phone.

As shown in FIG. 2A, the electronic device may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors. The controller may be a nerve center and a command center of the electronic device. The controller may generate an operation control signal based on instruction operation code and a time sequence signal, to complete control of instruction reading and instruction execution. A memory may further be disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

The USB port 130 is an interface that conforms to a USB standard specification, and may be specifically a mini USB port, a micro USB port, a USB Type-C port, or the like. The USB port 130 may be configured to connect to a charger to charge the electronic device, or may be configured to transmit data between the electronic device and a peripheral device. The charging management module 140 is configured to receive a charging input from the charger. The power management module 141 is configured to connect the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communication function of the electronic device may be implemented through the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna in the electronic device may be configured to cover one or more communication frequency bands. Different antennas may further be multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a solution that is for wireless communication including 2G/3G/4G/5G and the like and that is used in the electronic device. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The wireless communications module 160 may provide wireless communication solutions applied to the electronic device, including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication. NFC) technology, an infrared (infrared, IR) technology, and the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 of the electronic device is coupled to the mobile communications module 150, and the antenna 2 is coupled to the wireless communications module 160, so that the electronic device can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The display 194 is configured to display a display interface of an application and the like. The display 194 includes a display panel. A liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, quantum dot light emitting diodes (quantum dot light emitting diodes. QLED), or the like may be used for the display panel. In some embodiments, the electronic device may include one or N displays 194, where N is a positive integer greater than 1.

The camera 193 is configured to capture a static image or a video. In some embodiments, the camera 193 may include at least one camera, for example, one front-facing camera and one rear-facing camera.

The internal memory 121 may be configured to store computer-executable program code, and the executable program code includes instructions. The processor 110 runs the instructions stored in the internal memory 121, to implement various functional applications of the electronic device and process data. The internal memory 121 may include a program storage region and a data storage region. The program storage region may store an operating system, software code of at least one application (such as iQIYI or WeChat), and the like. The data storage region may store data (for example, an image and a video) created in a use process of the electronic device. In addition, the internal memory 121 may include a high-speed random access memory, and may further include a non-volatile memory, for example, at least one magnetic disk storage device, a flash storage device, or a universal flash storage (universal flash storage. UFS).

The external memory interface 120 may be configured to connect to an external storage card, for example, a micro SD card, to extend a storage capability of the electronic device. The external storage card communicates with the processor 110 through the external memory interface 120, to implement a data storage function. For example, files such as an image and a video are stored in the external memory card.

The electronic device may implement audio functions such as music playing or recording by using the audio module 170, the speaker 170A, the receiver 170B, the microphone 170C, the headset jack 170D, the application processor, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and may convert the pressure signal into an electrical signal. In some embodiments, the pressure sensor 180A may be disposed on the display 194. The gyro sensor 180B may be configured to determine a motion posture of the electronic device. In some embodiments, an angular velocity of the electronic device around three axes (namely, axes x, y, and z) may be determined by using the gyro sensor 180B.

The gyro sensor 180B may be configured to implement image stabilization during shooting. The barometric pressure sensor 180C is configured to measure barometric pressure. In some embodiments, the electronic device calculates an altitude by using the barometric pressure measured by the barometric pressure sensor 180C, to assist in positioning and navigation. The magnetic sensor 180D includes a Hall effect sensor. The electronic device may detect opening and closing of a flip cover by using the magnetic sensor 180D. In some embodiments, when the electronic device is a flip phone, the electronic device may detect opening and closing of a flip cover based on the magnetic sensor 180D. Further, a feature such as automatic unlocking upon opening of the flip cover is set based on a detected opening or closing state of the flip cover. The acceleration sensor 180E may detect accelerations in various directions (usually on three axes) of the electronic device, and may detect magnitude and a direction of gravity when the electronic device is stationary. The acceleration sensor 180E may further be configured to identify a posture of the electronic device, and is applied to an application such as switching between landscape mode and portrait mode or a pedometer.

The distance sensor 180F is configured to measure a distance. The electronic device may measure the distance through infrared or laser. In some embodiments, in a shooting scenario, the electronic device may measure the distance by using the distance sensor 180F, to implement quick focusing. The optical proximity sensor 180G may include, for example, a light-emitting diode (LED) and an optical detector, for example, a photodiode. The light-emitting diode may be an infrared light-emitting diode. The electronic device emits infrared light by using the light-emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device may adaptively adjust brightness of the display 194 based on the sensed brightness of the ambient light. The ambient light sensor 180L may also be configured to automatically adjust a white balance during shooting. The ambient light sensor 180L may further cooperate with the optical proximity sensor 180G to detect whether the electronic device is in a pocket, so as to avoid an unintentional touch. The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device reduces performance of a processor near the temperature sensor 180J, to reduce power consumption and implement heat protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K may also be referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device, and is located at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal.

The button 190 includes a power button, a volume button, and the like. The button 190 may be a mechanical button or a touch button. The electronic device may receive a button input, and generate a button signal input related to user setting and function control of the electronic device. The motor 191 may generate a vibration prompt. The motor 191 may be used for an incoming call vibration prompt, or may be used for a touch vibration feedback. For example, touch operations performed on different applications (for example, shooting and audio playing) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or be separated from the electronic device.

It may be understood that the components shown in FIG. 2A do not constitute a specific limitation on the electronic device. The electronic device may further include more or fewer components than those shown in the figure, or combine some components, or split some components, or have different component arrangements. In the following embodiments, the electronic device shown in FIG. 2A is used as an example for description.

Figure 2B:
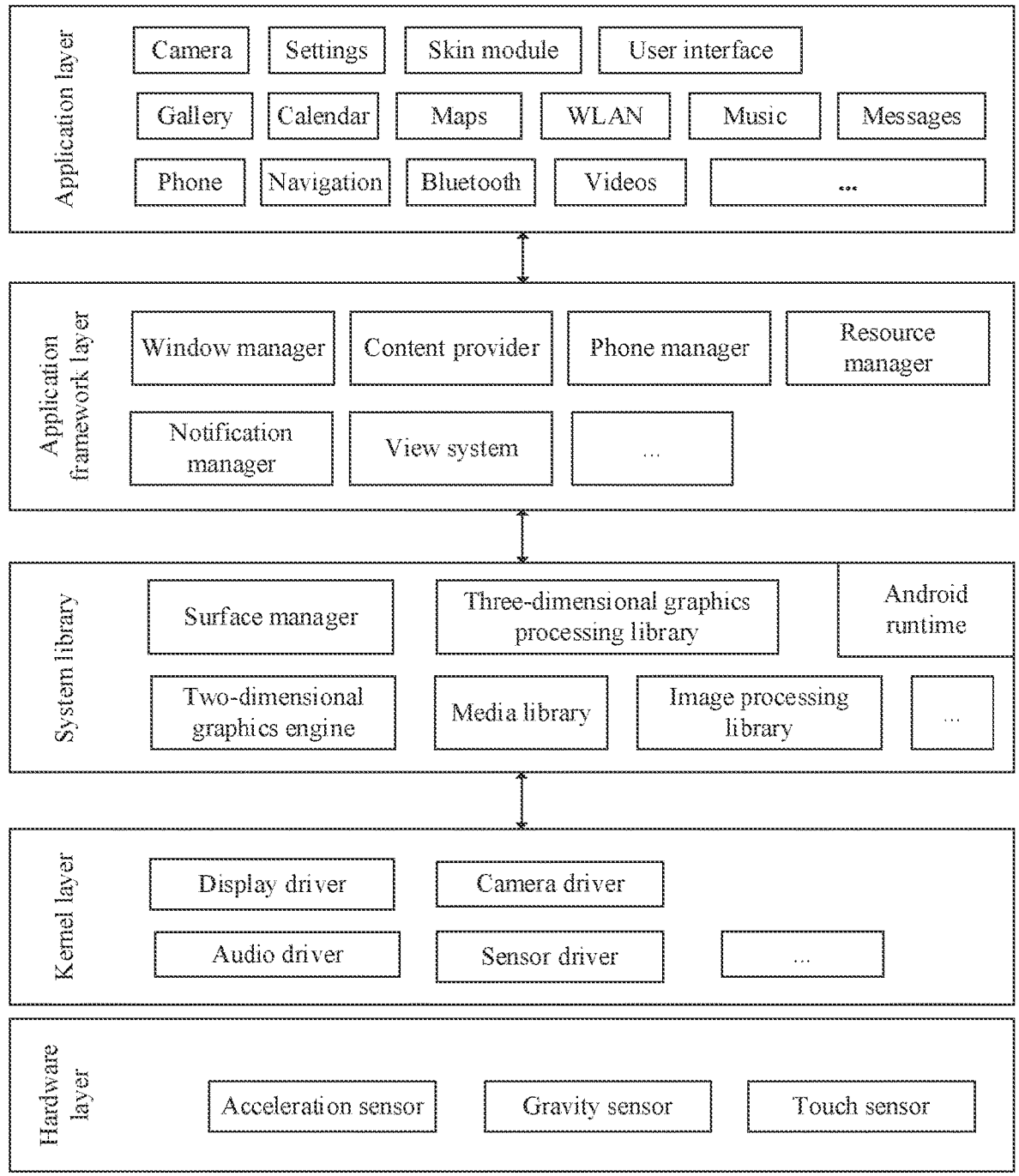
FIG. 2B is a schematic diagram of a software structure of an electronic device according to an embodiment of this application.

FIG. 2B is a block diagram of a software structure of a foldable electronic device according to an embodiment of this application. As shown in FIG. 2B, the software structure of the electronic device may be a layered architecture. For example, software may be divided into several layers, and each layer has a clear role and responsibility. The layers communicate with each other through a software interface. In some embodiments, an Android system is divided into four layers: an application layer, an application framework (framework, FWK) layer, an Android runtime (Android runtime) and system library, and a kernel layer from top to bottom.

The application layer may include a series of application packages. As shown in FIG. 2B, the application layer may include Camera, Settings, a skin module, a user interface (user interface, UI), a third-party application, and the like.

The third-party application may include WeChat, QQ, Gallery. Calendar, Phone. Maps, Navigation, WLAN, Bluetooth, Music. Videos, Messages, and the like.

The application framework layer provides an application programming interface (application programming interface, API) and a programming framework for an application at the application layer. The application framework layer may include some predefined functions. As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like. The content provider is configured to: store and obtain data, and enable the data to be accessed by an application. The data may include a video, an image, audio, calls that are made and received, a browsing history and bookmarks, an address book, and the like.

The view system includes a visual control, such as a control for displaying a text or a control for displaying a picture. The view system may be configured to construct an application. A display interface may include one or more views. For example, a display interface including a notification icon of Messages may include a text display view and a picture display view.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables the application to display notification information in the status bar, and may be configured to convey a notification message. The notification manager may automatically disappear after a short pause without a user interaction. For example, the notification manager is configured to notify download completion, give a message notification, and the like. The notification manager may alternatively be a notification that appears in a top status bar of the system in a form of a graph or a scroll bar text, for example, a notification of an application program running on a background or a notification that appears on the interface in a form of a dialog window. For example, text information is prompted in the status bar, a prompt tone is produced, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android. The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (media library), a three-dimensional graphics processing library (for example, OpenGL ES), and a 2D graphics engine (for example, SGL).

The surface manager is configured to: manage a display subsystem, and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264. MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

In addition, the system library may further include a form detection module (not shown in the figure), configured to identify a physical form of the electronic device. For example, the form detection module may be configured to determine the physical form of the electronic device based on sensor data uploaded by various types of sensors at a hardware layer. The physical form may include a folded form, an unfolded form, a semi-folded/semi-unfolded form with a specific angle, and the like.

The kernel layer is a layer between hardware and software. The kernel layer includes at least a display driver, a camera driver, an audio driver, and a sensor driver.

The hardware layer may include various types of sensors, for example, an acceleration sensor, a gyro sensor, and a touch sensor in embodiments of this application.

The following describes examples of working procedures of software and hardware of the electronic device with reference to the method for quickly entering an application in embodiments of this application.

In an example, after the sensor (for example, the acceleration sensor or the gyro sensor) at the hardware layer collects sensor data, the sensor data may be sent to the system library through the kernel layer. The form detection module in the system library determines a current physical form of the electronic device based on the sensor data. If the system library determines that the physical form of the electronic device changes from the folded form to the unfolded form, a display interface of a preset application may be displayed by using a display at the hardware layer. In this way, when unfolding the electronic device, a user directly enters the preset application, and the user does not need to select the application from a plurality of applications. This facilitates an operation.

FIG. 3(a) to FIG. 3(d) are schematic diagrams of a plurality of physical forms of a foldable electronic device according to an embodiment of this application. FIG. 4 is a schematic diagram of unfolded angles of a foldable electronic device in different physical forms according to an embodiment of this application. The following embodiments describe the foldable electronic device with reference to FIG. 3(a) to FIG. 3(d) and FIG. 4.

Figure 3A:
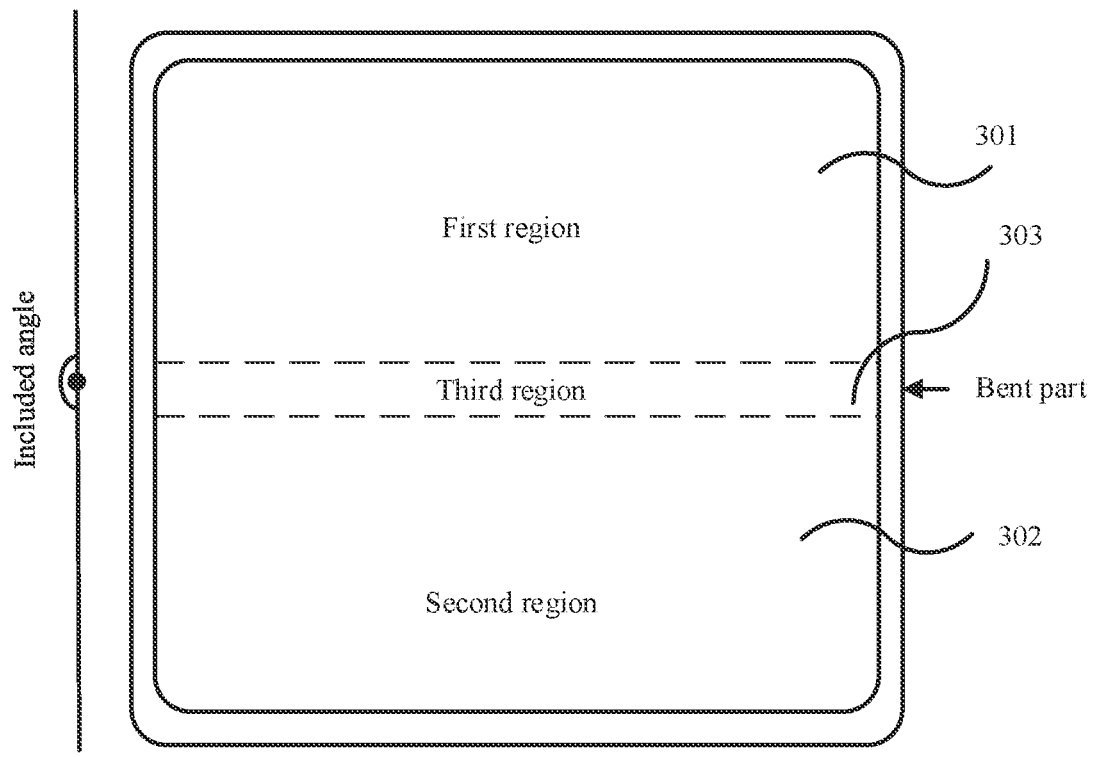
FIG. 3(a) to FIG. 3(d) are schematic diagrams of a physical form of an electronic device having a foldable screen according to an embodiment of this application.

As shown in FIG. 3(a), a display region on a foldable screen of the electronic device may include three regions: a first region 301, a second region 302, and a third region 303, and the third region 303 may be a foldable/bendable region.

In some embodiments, the foldable screen of the electronic device may be an entire screen, and the first region, the second region, and the third region may be different regions on the entire screen. In some other embodiments, the foldable screen of the electronic device may be formed by splicing a plurality of screens, for example, formed by splicing three screens. The first region is a display region on a first screen, the second region is a display region on a second screen, and the third region is a display region on a third screen. This is not limited in this embodiment of this application. It should be noted that the foldable screen of the electronic device may be a bezel-less screen, a non-bezel-less screen, a curved screen, or the like. This is not limited in this embodiment of this application. It should be understood that the first region on the foldable screen may be used as a primary screen, and the second region may be used as a secondary screen; or the first region may be used as a secondary screen, and the second region may be used as a primary screen. Functions of the primary screen and the secondary screen may be the same or different. Specifically, a region used as the primary screen and a region used as the secondary screen may be specified by a user, or may be set by default before delivery of the electronic device. This is not limited in this embodiment of this application.

In some embodiments, as an included angle between the first region 301 and the second region 302 on the foldable screen varies, the electronic device may have different physical forms, such as a folded form, a semi-folded/semi-unfolded form based on a specific angle, and an unfolded form. It should be understood that classification of the physical forms for the screen of the electronic device and definition of each physical form are not limited in this application.

Figure 3B:
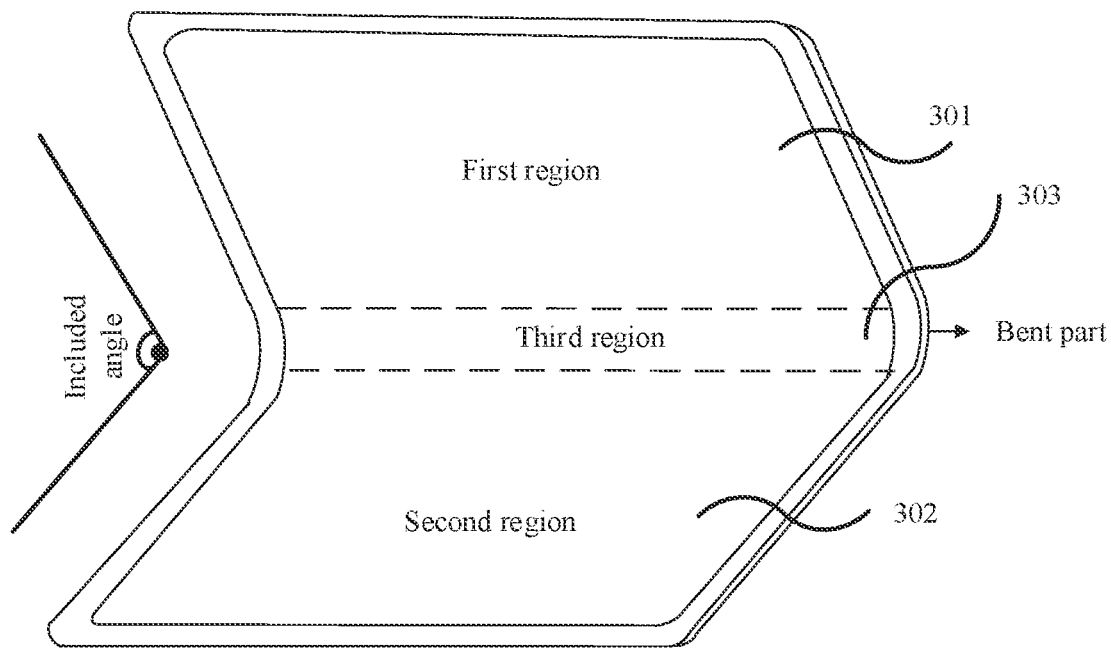

For example, the electronic device in the unfolded form may be shown in FIG. 3(a) or FIG. 3(b). Specifically, when the electronic device is in the unfolded form, an included angle between the first region 301 and the second region 302 is a first angle ε. As shown in FIG. 4, a2≤ε≤180 degrees, where a2 is greater than 90 degrees and less than or equal to 180 degrees. For example, a2 may be 150 degrees or 180 degrees.

Figure 3C:
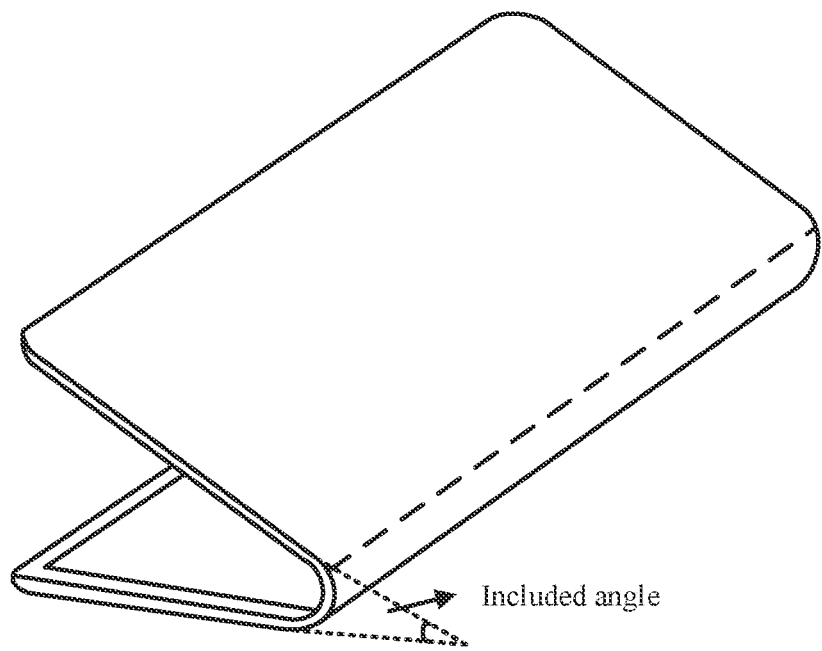

For example, the electronic device in the semi-folded/semi-unfolded form may be shown in FIG. 3(c). Specifically, when the electronic device is in the semi-folded form, an included angle between the first region 301 and the second region 302 is a second angle α. As shown in FIG. 4, a1≤α≤a2, where a1 is greater than 0 degrees and less than or equal to 90 degrees, and a2 is greater than or equal to 90 degrees and less than 180 degrees. For example, a1 may be 90 degrees, and a2 may be 150 degrees.

Figure 3D:
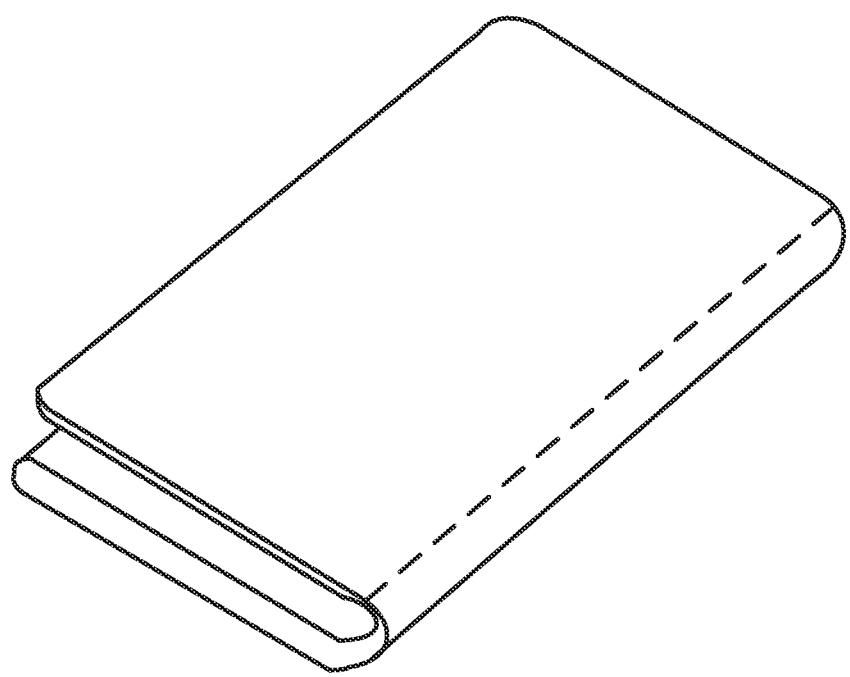

For example, the electronic device in the folded form may be shown in FIG. 3(d). Specifically, when the electronic device is in the folded form, an included angle between the first region 301 and the second region 302 is a third included angle β. As shown in FIG. 4, 0≤β≤a1, where a1 is greater than or equal to 0 degrees and less than or equal to 90 degrees. For example, a1 may be 0 degrees or 5 degrees. It should be noted that a specific value range in this application is merely an example rather than a limitation.

In the technical solutions provided in this application, when the electronic device changes from the folded form to the unfolded form, a preset application may be quickly opened, and a display interface of the application may be displayed. FIG. 3(a) to FIG. 3(d) are used as an example. When detecting that the form shown in FIG. 3(d) is changed to the form shown in FIG. 3(a) or FIG. 3(b), the electronic device may directly open the preset application and display the display interface of the application. It should be noted that the preset application may be set in a plurality of manners. The following embodiments provide descriptions by using examples.

Example 1: The preset application may be an application specified by the user. For example, the electronic device may provide, by using a settings application, the user with an opportunity to set the preset application. Alternatively, the electronic device may provide, by using a shortcut, an entry for setting the preset application. The shortcut may be a drop-up menu, a control interface corresponding to a floating dock, or the like. This is not limited in this embodiment of this application. Therefore, the user may set, based on a requirement of the user, an application that is directly entered when the electronic device is unfolded, to facilitate a user operation.

Example 2. The preset application may be an application that is last run/displayed before the electronic device is folded into the folded form last time. "Folded into the folded form last time" may mean that the electronic device is folded into the folded form for a last time before being unfolded.

Figure 5B:
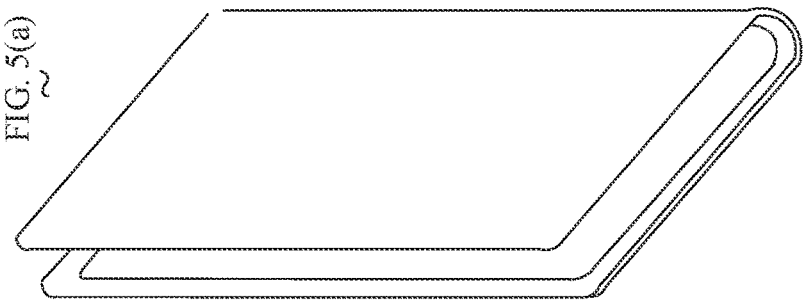
FIG. 5(a) to FIG. 8 are schematic diagrams of a structure of an electronic device according to an embodiment of this application.
Figure 5C:
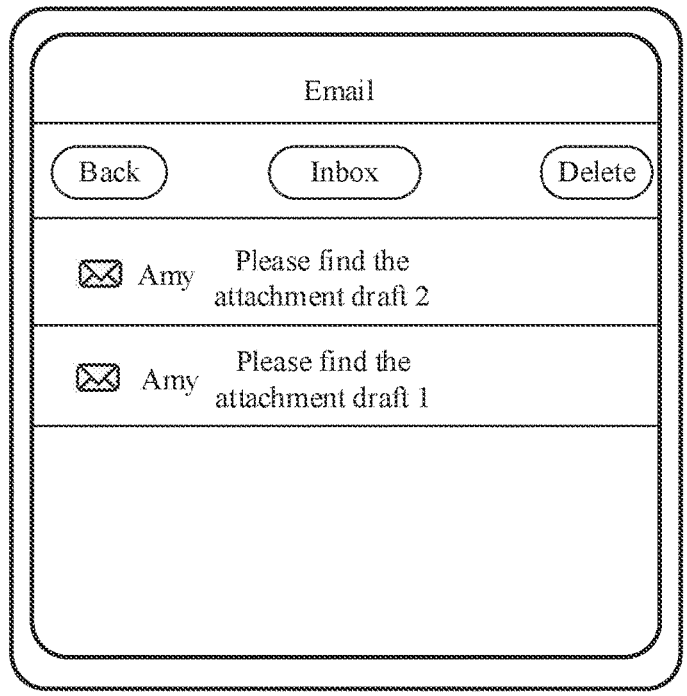

For example, FIG. 5(a) is used as an example. The electronic device is in the unfolded form, and the user processes a transaction by using an email application on the electronic device. For example, the electronic device displays a display interface of an inbox of the email application. Then, the electronic device is folded into the folded form, as shown in FIG. 5(b). In other words, when the electronic device displays the display interface of the email application, the electronic device is folded into the folded form. In this case, the email application is the application that is last displayed before the electronic device is folded. As shown in FIG. 5(c), when the electronic device is unfolded again, the email application is entered.

In some examples, after the electronic device is unfolded, a subpage of the email application may be displayed. The subpage may be a subpage that is of the email application and that is last displayed before the electronic device is unfolded, or any subpage of the email application, for example, a home page. For example, in FIG. 5(a), the display interface of the inbox is displayed before the electronic device is folded. In FIG. 5(c), after the electronic device is unfolded again, the display interface of the inbox is displayed.

For another example, before the electronic device is folded, a display interface of iQIYI is displayed, and the display interface includes a playing interface for a movie that is being played. Then, the electronic device is folded into the folded form. When the electronic device is unfolded again, the playing interface may be displayed, and the movie continues to be played. Therefore, in this example, if the electronic device is folded into the folded form when displaying a first interface of an application, when the electronic device is unfolded again, the first interface of the application may be directly displayed, thereby facilitating the user operation.

Certainly, in some other embodiments, FIG. 5(a) is still used as an example. The electronic device is in the unfolded form, and displays the display interface of the email application. Then, the electronic device detects an operation used to return to a home screen, and the electronic device displays the home screen in response to the operation. Then, the electronic device is folded into the folded form. In this case, when the electronic device is folded, the email application is switched to the background, and the foreground displays the home screen. Therefore, the application that is last run/displayed by the electronic device before the electronic device is folded is also the email application. When the electronic device is unfolded again, the email application may still be entered. For another example, FIG. 5(a) is still used as an example. The electronic device is in the unfolded form, and displays the display interface of the email application. Then, the electronic device detects a screen-off operation, and turns off the screen in response to the operation. Then, the electronic device is folded into the folded form. In this case, when the electronic device is folded, the screen is turned off, and the application that is last run/displayed by the electronic device before the electronic device is folded is also the email application. When the electronic device is unfolded again, the email application may still be entered.

Example 3: The preset application may be an application corresponding to a message received when the electronic device is in the folded form.

For example, when the electronic device is in the folded form, if a new message, for example, a new message of WeChat/Messages, is received, after the electronic device is unfolded, a display interface of WeChat/Messages may be directly entered, and the display interface includes the received new message.

Example 4: The preset application may be an application that is on the electronic device and that is most frequently used or has the longest usage duration within preset duration.

In some embodiments, the preset duration may be duration from a first moment at which the electronic device is unfolded into the unfolded form last time to a second moment at which the electronic device is folded into the folded form, and unfolding and folding are performed only once within the duration. For example, FIG. 5(a) is used as an example. The electronic device is unfolded, and a first moment is recorded. The first moment may be a moment at which the electronic device detects that an unfolding angle is 180 degrees. Then, the electronic device is folded after running for a period of time, as shown in FIG. 5(b). The electronic device records a second moment, where the second moment may be a moment at which the unfolding angle is 0 degrees. Therefore, the preset duration is duration between the first moment and the second moment. It is assumed that the email application is most frequently used on the electronic device within the duration. When the electronic device is unfolded again, the email application is entered. In this example, the electronic device determines an application that is most frequently used in a process from being unfolded to being folded last time, and when the electronic device is unfolded again, the electronic device enters the application.

Certainly, the preset duration may alternatively be 3 hours, 5 hours, 12 hours, or the like starting from a fixed moment, for example, 00:00 every day. This is not limited in this embodiment of this application.

The foregoing describes several possible implementations of the preset application. In actual application, the preset application may alternatively have an implementation. For example, the preset application is set by default after delivery of the electronic device. This is not limited in this embodiment of this application.

In some embodiments, there may be one or more preset applications, which are described in detail in the following embodiments.

Case 1: There is one preset application.

For example, after being unfolded, the electronic device may display a display interface of the preset application m full screen. In this example, after being unfolded, the electronic device displays the display interface of the preset application in full screen. If the electronic device detects a preset operation, the electronic device may exit the display interface of the preset application, and display the home screen (home screen). The preset operation may be an operation of tapping a home key, an operation of tapping the home screen in a floating dock, or the like.

For another example, after being unfolded, the electronic device enters a split-screen mode. In the split-screen mode, a display interface of the preset application is displayed in a first display region, and the home screen is displayed in a second display region. In the split-screen mode, display areas of the first display region and the second display region may be the same or different. This is not limited in this embodiment of this application. For example, the first display region mainly includes a primary screen, and the second display region mainly includes a secondary screen. Alternatively, the second display region mainly includes a primary screen, and the first display region mainly includes a secondary screen, or the like.

In this example, when detecting a first preset operation, the electronic device may exit the split-screen mode, and displays the home screen in full screen. The first preset operation may be an operation of tapping (tapping or double-tapping) a blank region in the second display region, an operation of touching and holding a blank region in the second display region and dragging the blank region in a dragging direction toward the first display region, an operation of touching and holding a demarcation line between the first display region and the second display region and dragging the demarcation line in a dragging direction toward the first display region, or the like. When detecting a second preset operation, the electronic device may exit the split-screen mode, and display the display interface of the preset application in full screen. The second preset operation may be an operation of tapping (tapping or double-tapping) a blank region in the first display region, an operation of touching and holding a blank region in the first display region and dragging the blank region in a dragging direction toward the second display region, an operation of touching and holding a demarcation line between the first display region and the second display region and dragging the demarcation line in a dragging direction toward the second display region, or the like.

For another example, after being unfolded, the electronic device enters a split-screen mode. In the split-screen mode, the home screen is displayed in a first display region, and an icon of the preset application is displayed in a second display region. When the electronic device detects an operation performed on the icon of the preset application, a display interface of the preset application is displayed in the second display region, or the display interface of the application is displayed in full screen.

For another example, after being unfolded, the electronic device displays the home screen in full screen. The home screen includes prompt information, and the prompt information is used to prompt the user whether to enter the preset application. After receiving an OK instruction, the electronic device displays a display interface of the preset application in full screen, or enters a split-screen mode and simultaneously displays the home screen and the display interface of the preset application in the split-screen mode. When receiving a cancel instruction, the electronic device cancels displaying the prompt information, and displays the home screen in full screen.

Case 2: There is a plurality of preset applications.

In a possible case, after being unfolded, the electronic device may display an icon of each of the plurality of preset applications. When detecting an operation performed on an icon, the electronic device opens a display interface of a preset application corresponding to the icon. In another possible case, when being unfolded into the unfolded form, the electronic device simultaneously displays display interfaces of the plurality of preset applications. The following embodiments provide descriptions by using examples.

Figure 6A:
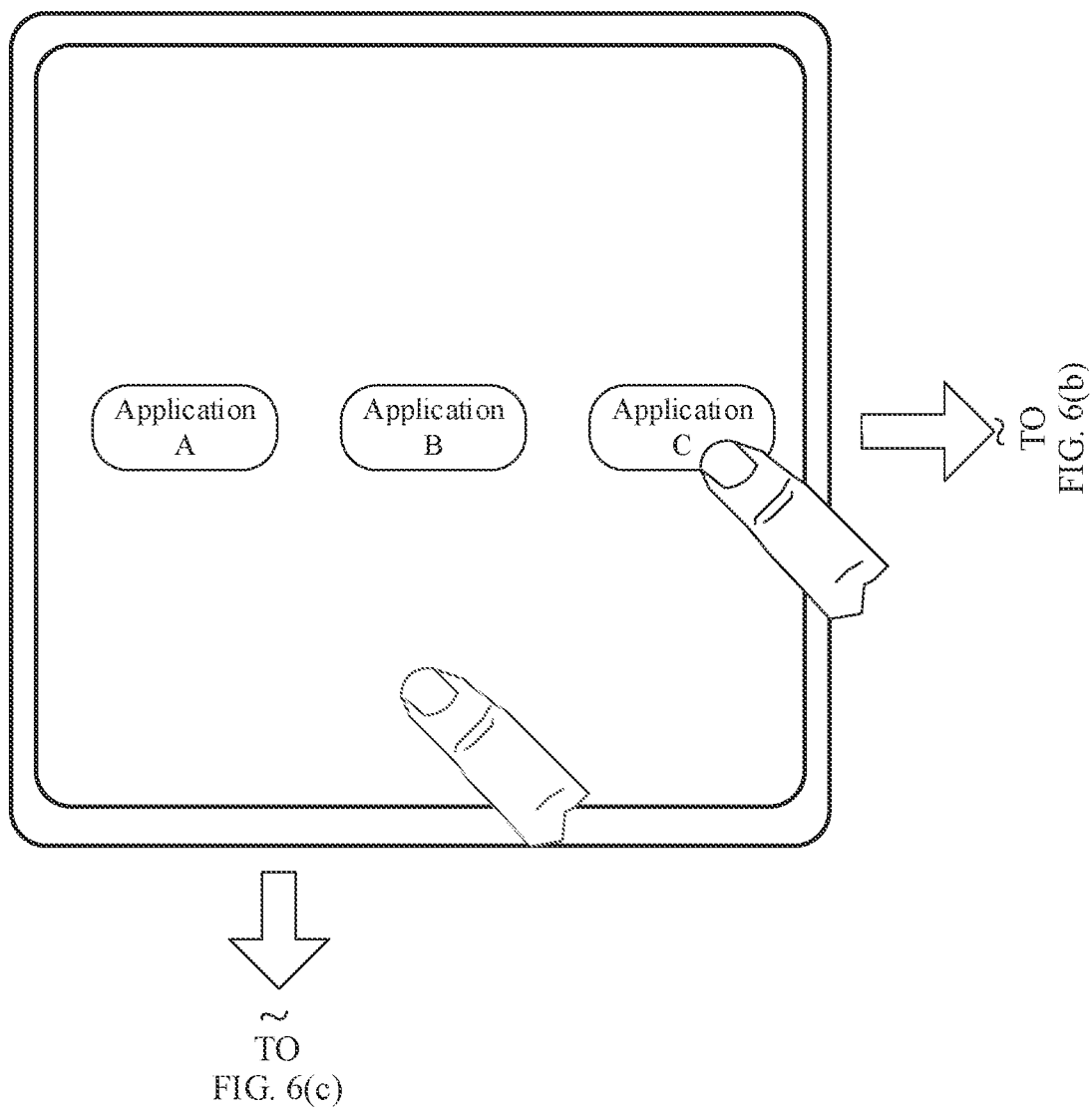
Figure 6B:
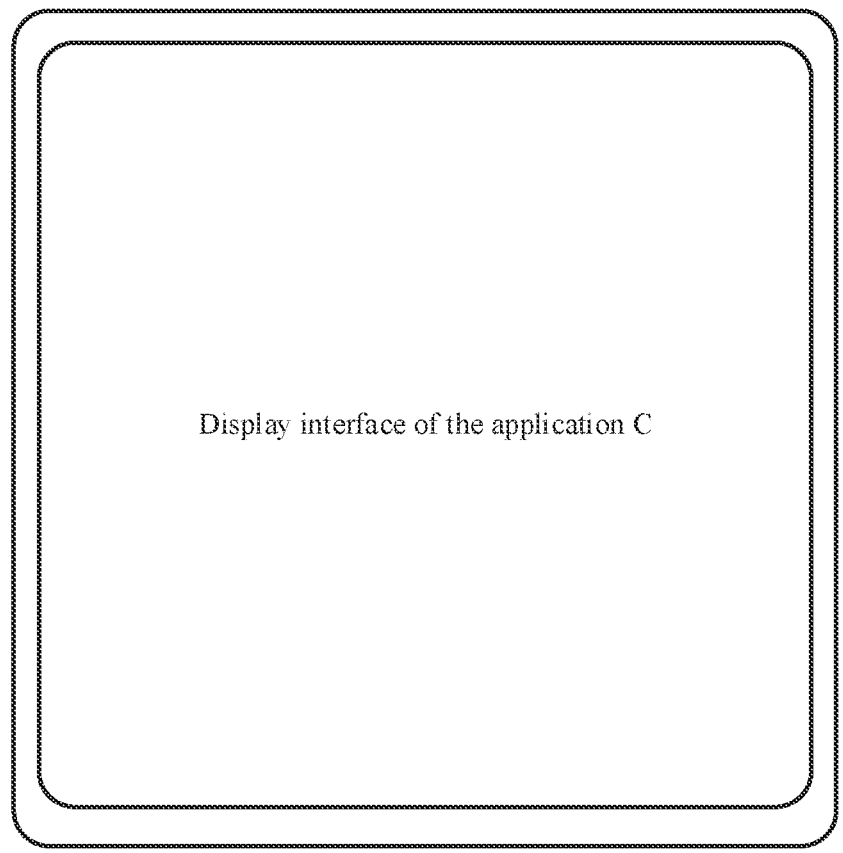
Figure 6C:
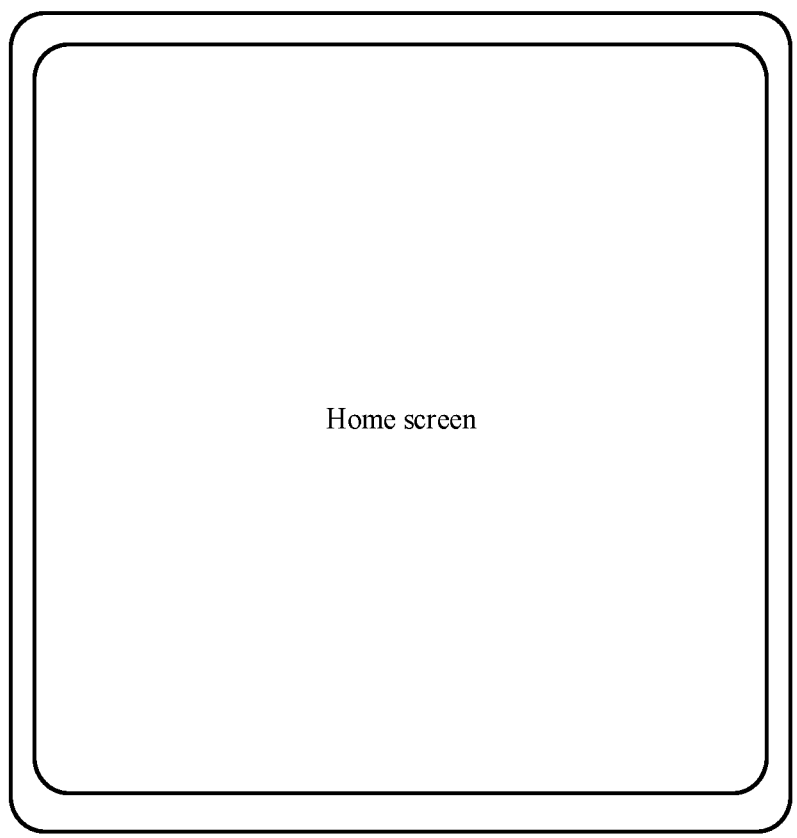

Example 1: As shown in FIG. 6(a), when the electronic device is unfolded from the folded form to the unfolded form, icons corresponding to preset applications (including an application A, an application B, and an application C) are displayed. When detecting an operation performed on the icon of the application C, the electronic device displays a display interface of the application C in full screen, as shown in FIG. 6(b). When detecting an operation of tapping (for example, a tapping/double-tapping operation) another region (for example, a region in which an icon of an application other than the application A to the application C is located), the electronic device displays the home screen, as shown in FIG. 6(c).

In this example, when being unfolded, the electronic device displays icons of a plurality of applications to the user for selection by the user. Certainly, the user may alternatively choose to display the home screen. An operation is convenient.

Figure 7A:
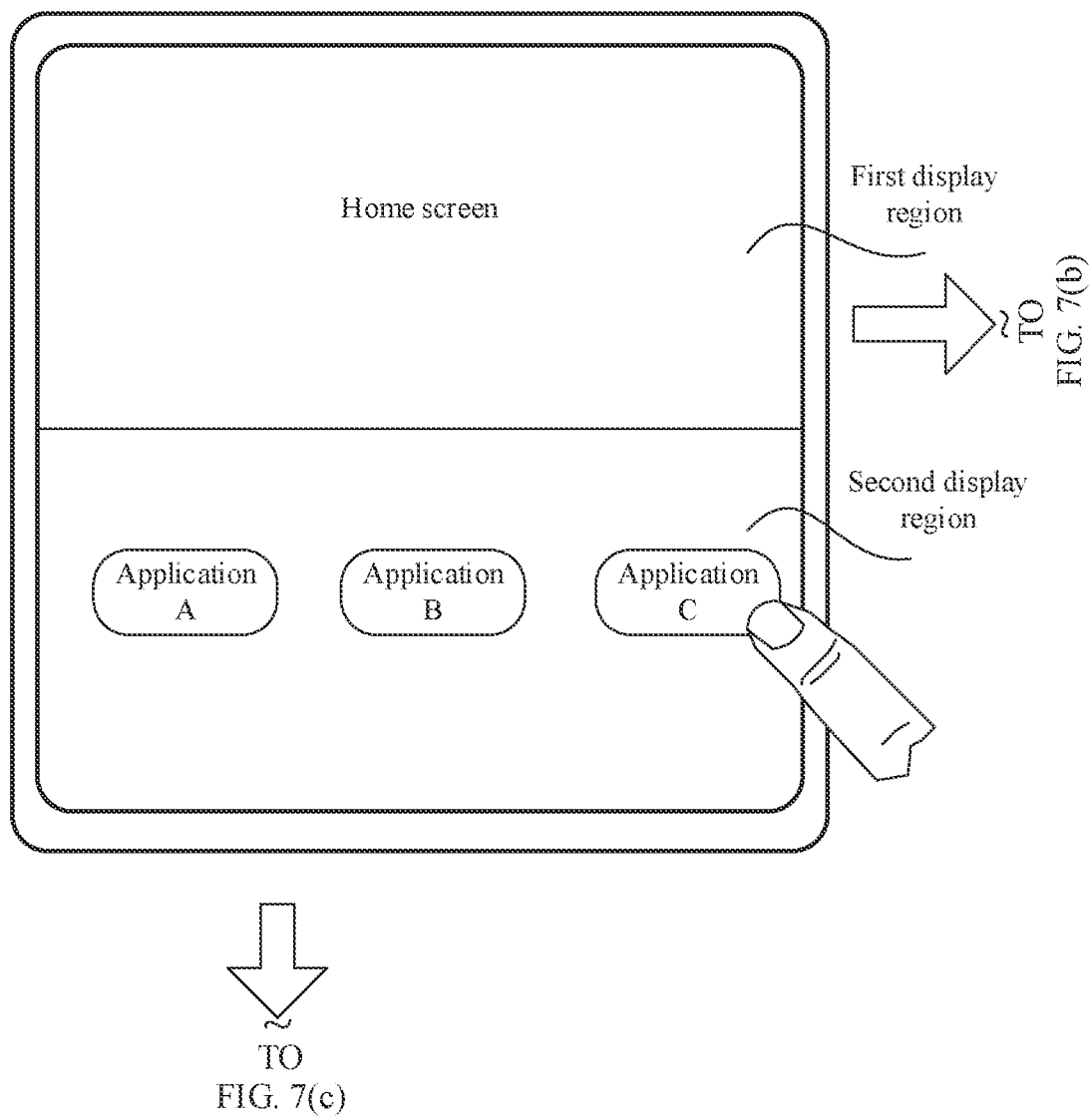
Figure 7B:
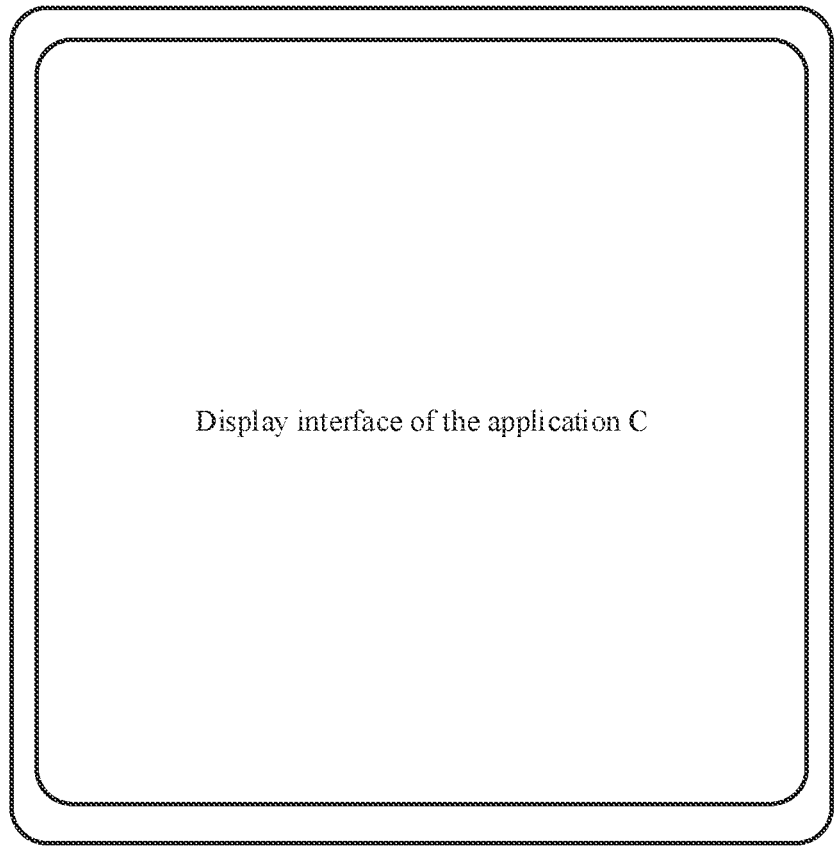
Figure 7C:
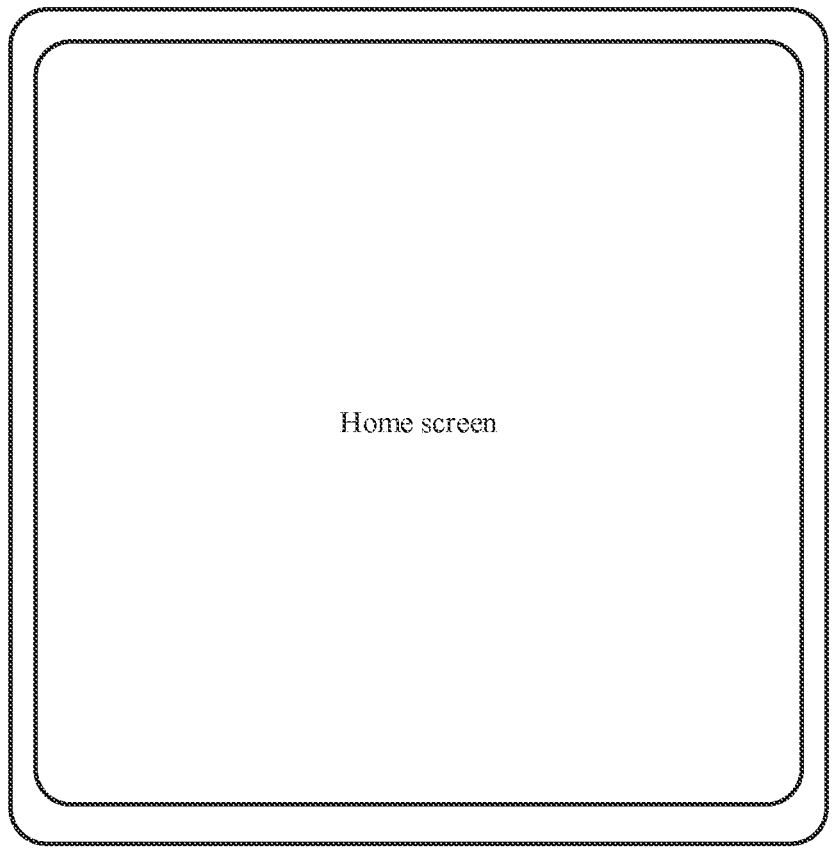

Example 2:

As shown in FIG. 7(a), when being unfolded, the electronic device enters a split-screen mode. The home screen is displayed in a first display region, and icons corresponding to an application A, an application B, and an application C are displayed in a second display region. When detecting an operation performed on the icon of the application C, the electronic device displays a display interface of the application C on a secondary screen, or displays a display interface of the application C in full screen, as shown in FIG. 7(b). Certainly, still as shown in FIG. 7(a), when detecting a preset operation, the electronic device may exit the split-screen mode, and display the home screen in full screen, as shown in FIG. 7(c). The preset operation may be an operation of dragging a demarcation line and moving down a split interface, or a sliding-down operation at any position in the first display region (for example, a region in which an icon of an application other than the application A to the application C is located). Alternatively, the preset operation may be a tapping/double-tapping operation or the like performed on a blank region in the first display region.

In this example, when being unfolded, the electronic device simultaneously displays the home screen and icons of the plurality of preset applications for selection by the user. This facilitates a user operation.

Example 3:

When there is a plurality of preset applications, the electronic device may determine one preset application from the plurality of preset applications according to a preset policy. When being unfolded, the electronic device displays a display interface of the determined preset application in full screen. There may be a plurality of implementations in which the electronic device determines the preset application from the plurality of preset applications according to the preset policy. For example, the electronic device determines a preset application that is last used from the plurality of preset applications. Alternatively, the electronic device determines a preset application that is most frequently used from the plurality of preset applications. Alternatively, the electronic device determines a preset application with the longest usage duration from the plurality of preset applications. Alternatively, the electronic device determines a preset application that is most likely to be used in a current geographical location from the plurality of preset applications based on the current geographical location. (For example, the preset applications include an iQIYI application and an email application. The electronic device determines that the electronic device is currently in an office. When the electronic device is unfolded, a display interface of the email application is displayed, and a display interface of the iQIYI application is not displayed.) Alternatively, the electronic device determines a preset application that is most likely to be used at current time from the plurality of preset applications based on the current time. (For example, the preset applications include an iQIYI application and an email application, and the electronic device collects statistics that iQIYI is most frequently used in a time period from 20:00 to 24:00 at night. In this case, when the electronic device is unfolded, if the electronic device detects that the current time is 21:00, a display interface of the iQIYI application is displayed, and a display interface of the email application is not displayed.) Alternatively, the electronic device determines a preset application from the plurality of preset applications based on a Wi-Fi identifier of currently accessed Wi-Fi. (For example, the electronic device detects that an iQIYI application is most frequently used when Wi-Fi 1 is accessed. In this case, when the electronic device is unfolded, if the electronic device detects that the Wi-Fi 1 is currently accessed, a display interface of the iQIYI application is displayed, and a display interface of an email application is not displayed.)

Figure 8:
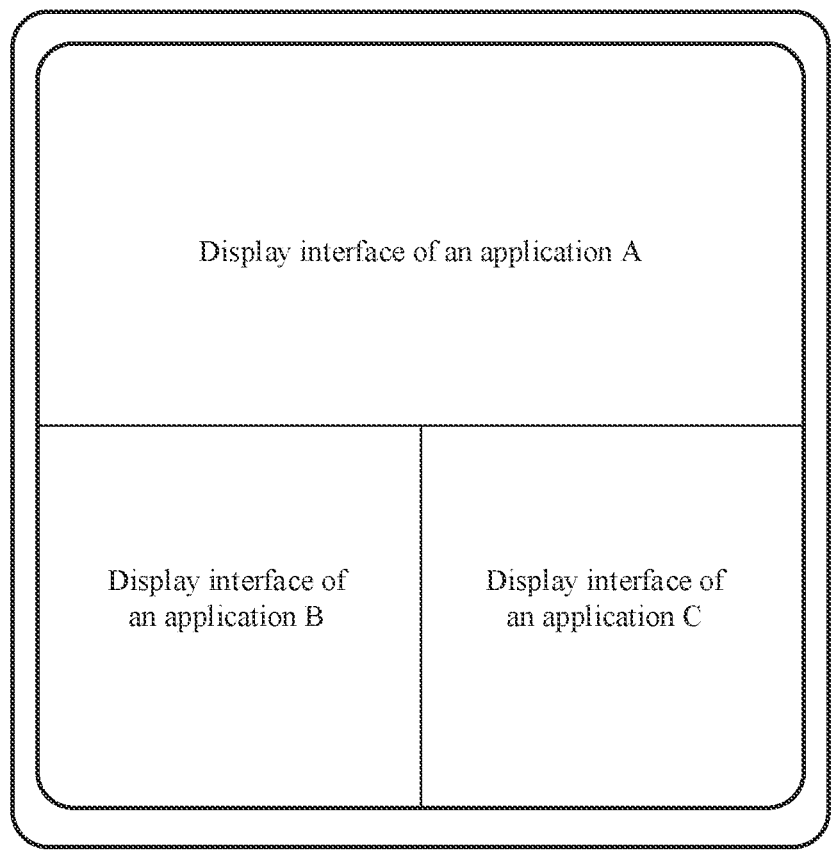

Example 4:

If there is a plurality of preset applications, when being unfolded, the electronic device simultaneously displays a display interface of each of the plurality of preset applications. For example, as shown in FIG. 8, the preset applications include an application A, an application B. and an application C. When the electronic device is unfolded, display interfaces of the application A, the application B, and the application C are simultaneously displayed.

In an example, when simultaneously displaying the display interfaces of the plurality of preset applications, the electronic device may determine a display order, display areas, and/or the like of the display interfaces of the plurality of preset applications according to a specific policy. For example, the electronic device determines whether a preset application currently runs in the background. If there is a preset application currently running in the background, one or more applications running in the background are displayed at the top or have the largest display area. FIG. 8 is used as an example. The application A runs in the background, and the application B and the application C do not run. Therefore, the application A is displayed in an uppermost region and has the largest display area.

For another example, the electronic device may sort the display interfaces of the plurality of preset applications based on a usage frequency/usage duration of each preset application. For example, a preset application that is most frequently used/has a relatively long usage duration may be displayed at the top or has the largest display area. FIG. 8 is used as an example. The application A is most frequently used. Therefore, the application A is displayed in the uppermost region and has the largest display area.

For another example, the electronic device may determine a preset application with the highest usage probability in a current time period. Then, the preset application is displayed at the top and/or has the largest display area. In a possible implementation, the electronic device may collect statistics on usage statuses of each application in different time periods. For example, the current time period is 8:00 to 10:00 at night, and an iQIYI application is most frequently used. In this case, after the electronic device is unfolded, the electronic device may display a display interface of the iQIYI application.

For another example, the electronic device may alternatively determine, based on a current geographical location, a preset application with the highest usage probability at the current geographical location. Then, the preset application is displayed at the top and/or occupies the largest display area. For example, the preset applications include an email application. If the electronic device determines that the electronic device is currently in an office, after the electronic device is unfolded, the email application may be displayed at the top, or an area of a display interface of the email application is the largest.

For another example, the electronic device may alternatively determine, based on a currently accessed Wi-Fi hotspot, a preset application with the highest usage probability when the Wi-Fi hotspot is accessed, and then display the preset application at the top. For example, the electronic device detects that Wi-Fi 1 is currently accessed, and learn from a historical record that an iQIYI application is most frequently used after the Wi-Fi 1 is accessed. Therefore, the iQIYI application is displayed at the top and/or occupies the largest display area.

In some other embodiments, the electronic device may enter different interfaces when being landscape-unfolded and portrait-unfolded. The following first defines a landscape-folded form and a portrait-folded form. For example, aspect ratios of the electronic device in the landscape-folded form and the portrait-folded form are different. The aspect ratio of the electronic device is a ratio of a height to a width of the electronic device. In the landscape-folded form, the height of the electronic device is ½ of a length of a bent edge, and the width of the electronic device is a length of an unfolded edge. In the portrait-folded form, the height of the electronic device is a length of an unfolded edge, and the width of the electronic device is ½ of a length of a bent edge.

For example, as shown in FIG. 9(*a*), the electronic device is in the landscape-folded form. The width of the electronic device is X, the height of the electronic device is Y=A/2, and A is a length of an edge 1 (the bent edge). In this case, the aspect ratio of the electronic device is Y/X, where Y/X<1. It should be noted that, as shown in FIG. 9(*b*), when the electronic device is tilted or rotated by a relatively small angle α in the landscape-folded form shown in FIG. 9(*a*) (for example, the angle α is not greater than a first preset threshold, for example, 20°, 15°, or 5°), the electronic device is still considered to be in the landscape-folded form.

For example, as shown in FIG. 9(*c*), the electronic device is in the portrait-folded form. The height of the electronic device is X, the width is Y, Y=A/2, and A is a length of an edge 1 (the bent edge). In this case, the aspect ratio of the electronic device is Y/X, where Y/X>1. It should be further noted that, as shown in FIG. 9(*d*), when the electronic device is tilted or rotated by a relatively small angle C in the portrait-folded form shown in FIG. 9(*c*) (for example, the angle is not greater than a second preset threshold, for example, 20°, 15°, or 5°), the electronic device is still considered to be in the portrait-folded form.

Figure 10A:
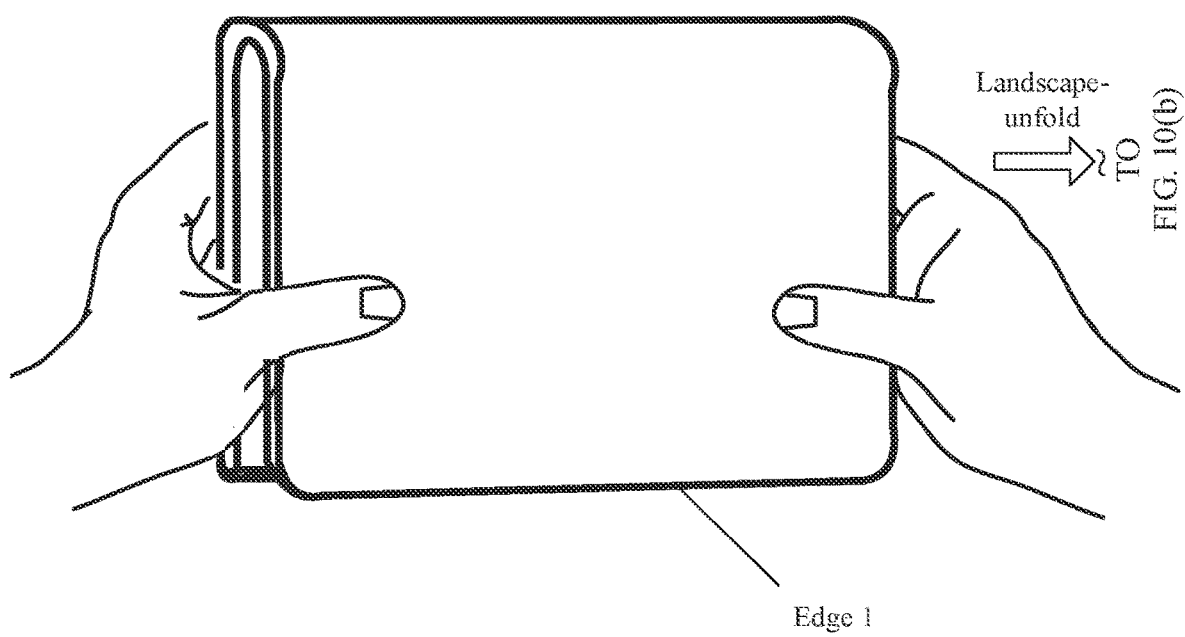
FIG. 10(a) and FIG. 10(b) are a schematic diagram of landscape unfolding of an electronic device having a foldable screen according to an embodiment of this application.
Figure 10B:
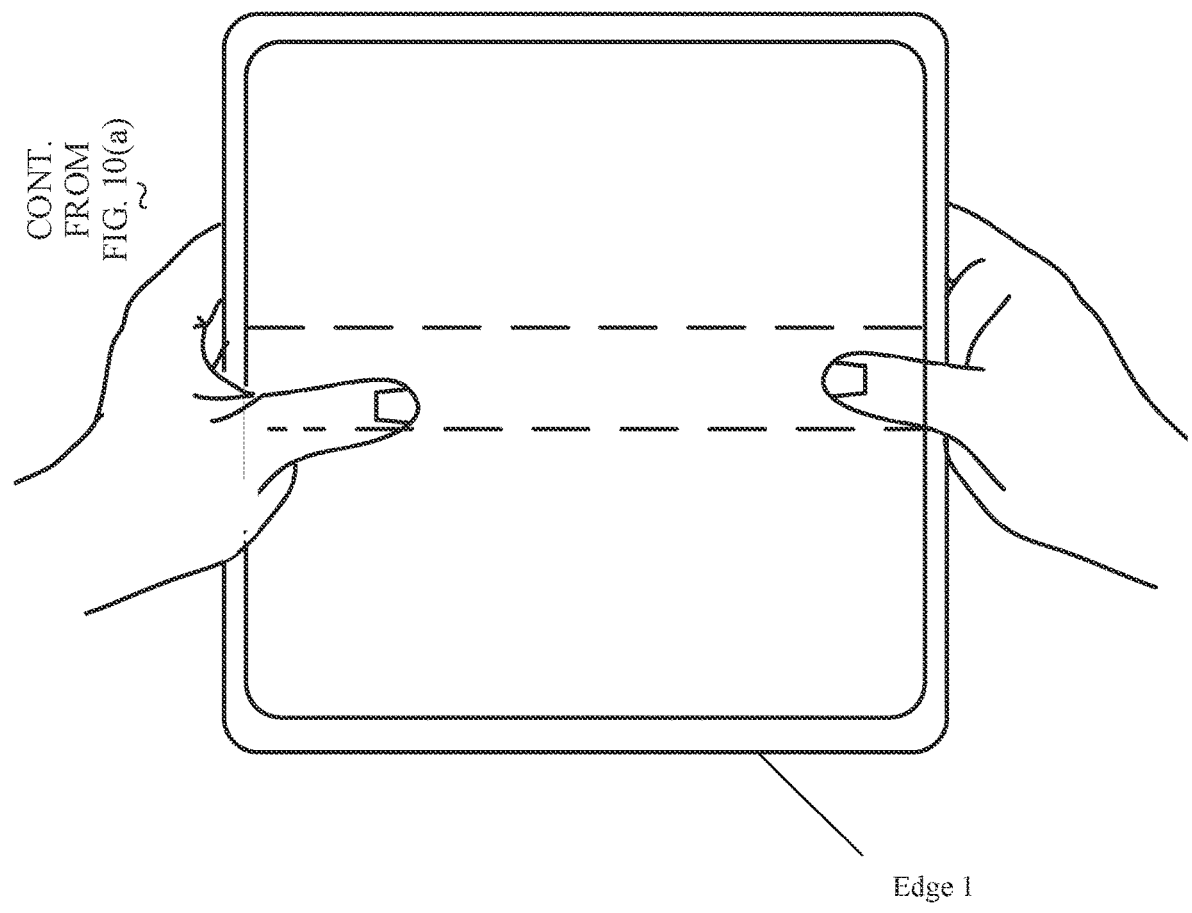
Figure 11A:
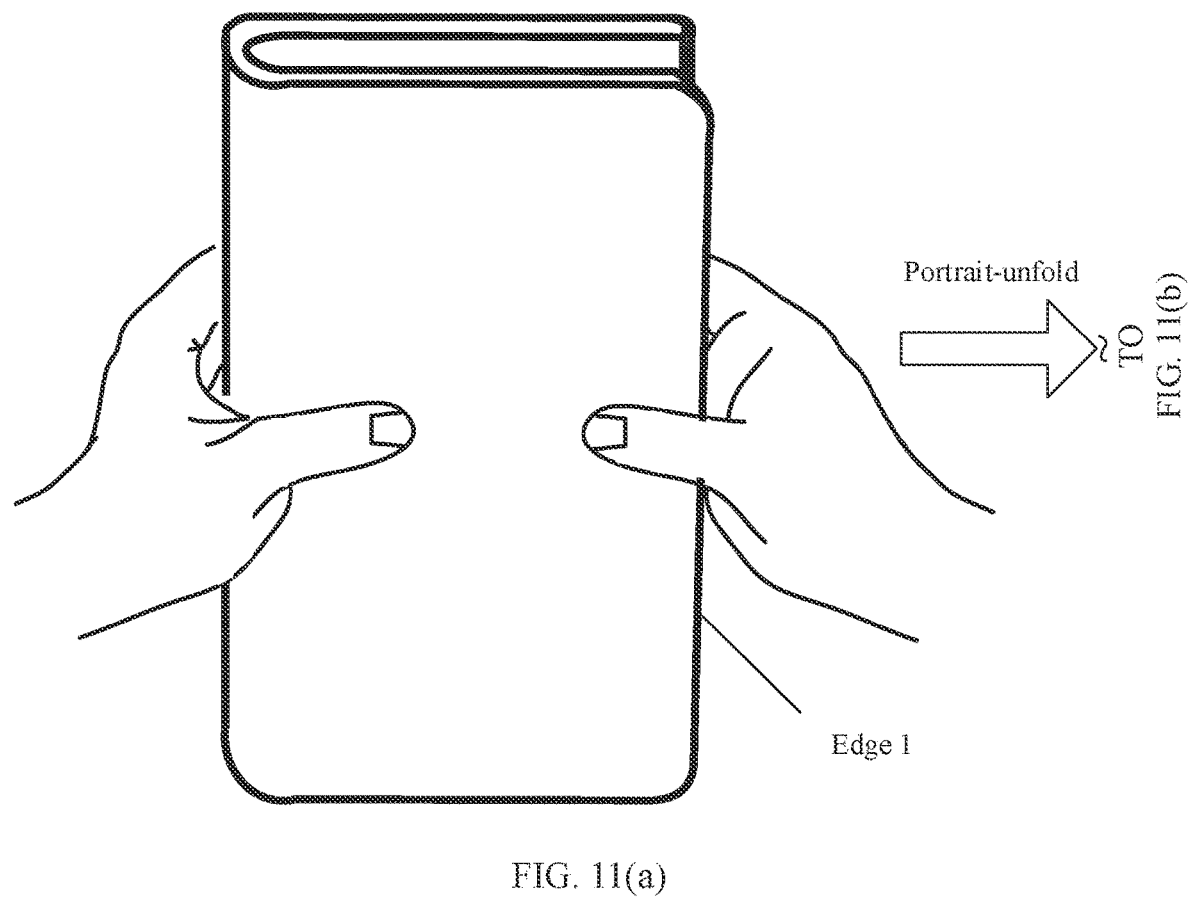
FIG. 11(a) and FIG. 11(b) are a schematic diagram of portrait unfolding of an electronic device having a foldable screen according to an embodiment of this application.
Figure 11B:
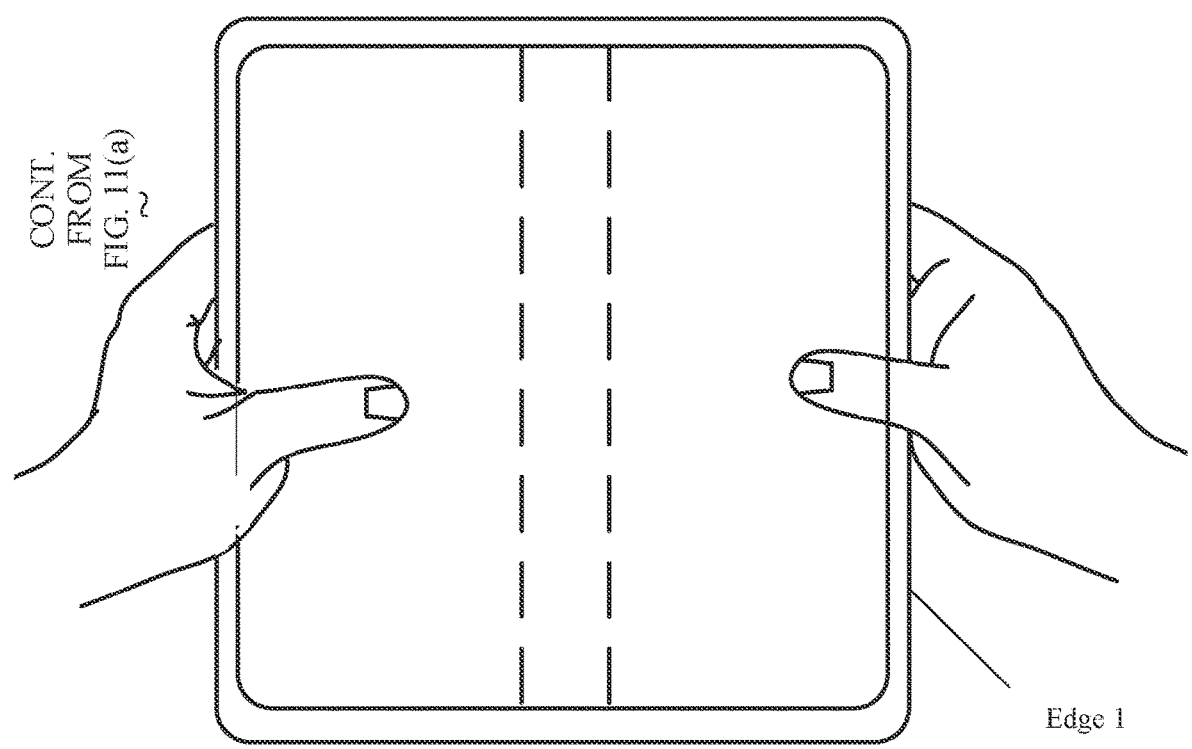

It should be understood that landscape unfolding is that the electronic device is unfolded when the electronic device is in the landscape-folded form, and portrait unfolding is that the electronic device is unfolded when the electronic device is in the portrait-folded form. For example, as shown in FIG. 10(*a*), the electronic device is in the landscape-folded form, the edge 1 is in a horizontal state, and the edge 1 is not bent. As shown in FIG. 10(*b*), after the electronic device is landscape-unfolded, the edge 1 is still in the horizontal state or approaches the horizontal state. Therefore, the process is a landscape unfolding process. For example, as shown in FIG. 11(*a*), the electronic device is in the portrait-folded form, the edge 1 is in a vertical state, and the edge 1 is not bent. As shown in FIG. 11(*b*), after the electronic device is portrait-unfolded, the edge 1 is still in the vertical state or approaches the vertical state. Therefore, the process is a portrait unfolding process.

Figure 12A:
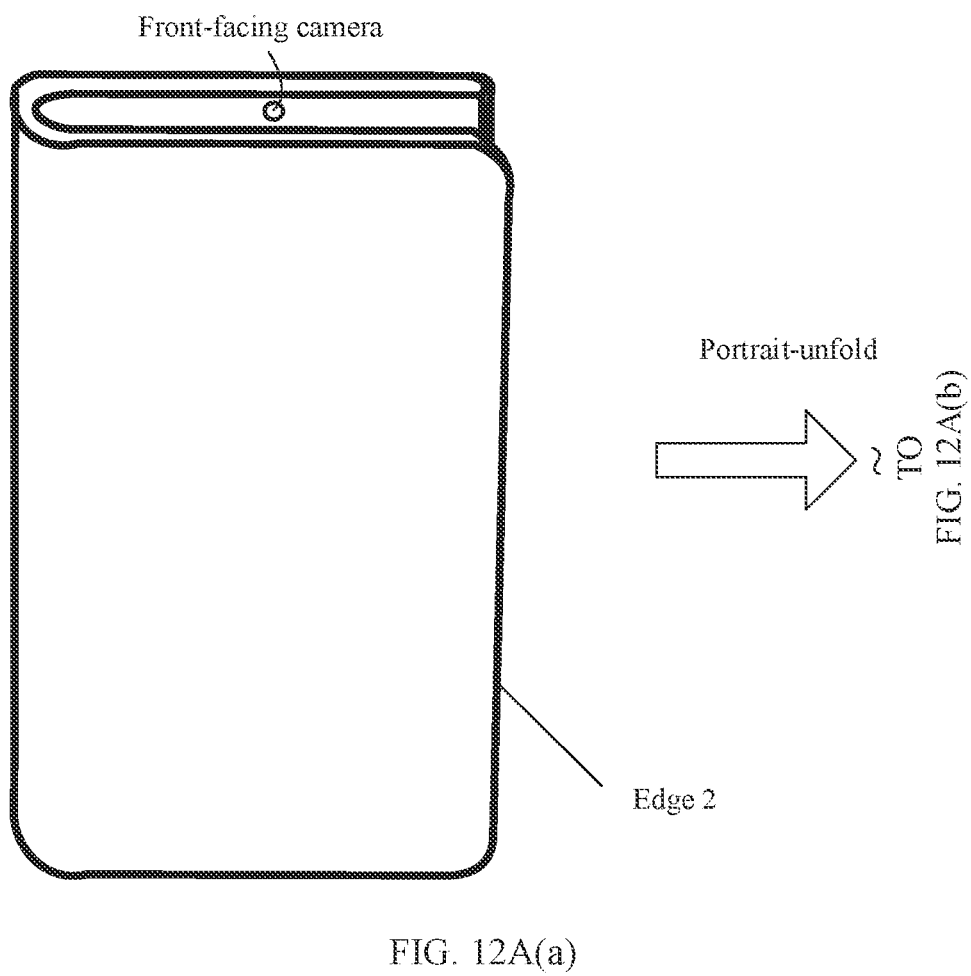
FIG. 12A(a) to FIG. 12C(b) are schematic diagrams of a display interface of an electronic device having a foldable screen according to an embodiment of this application.
Figure 12A:
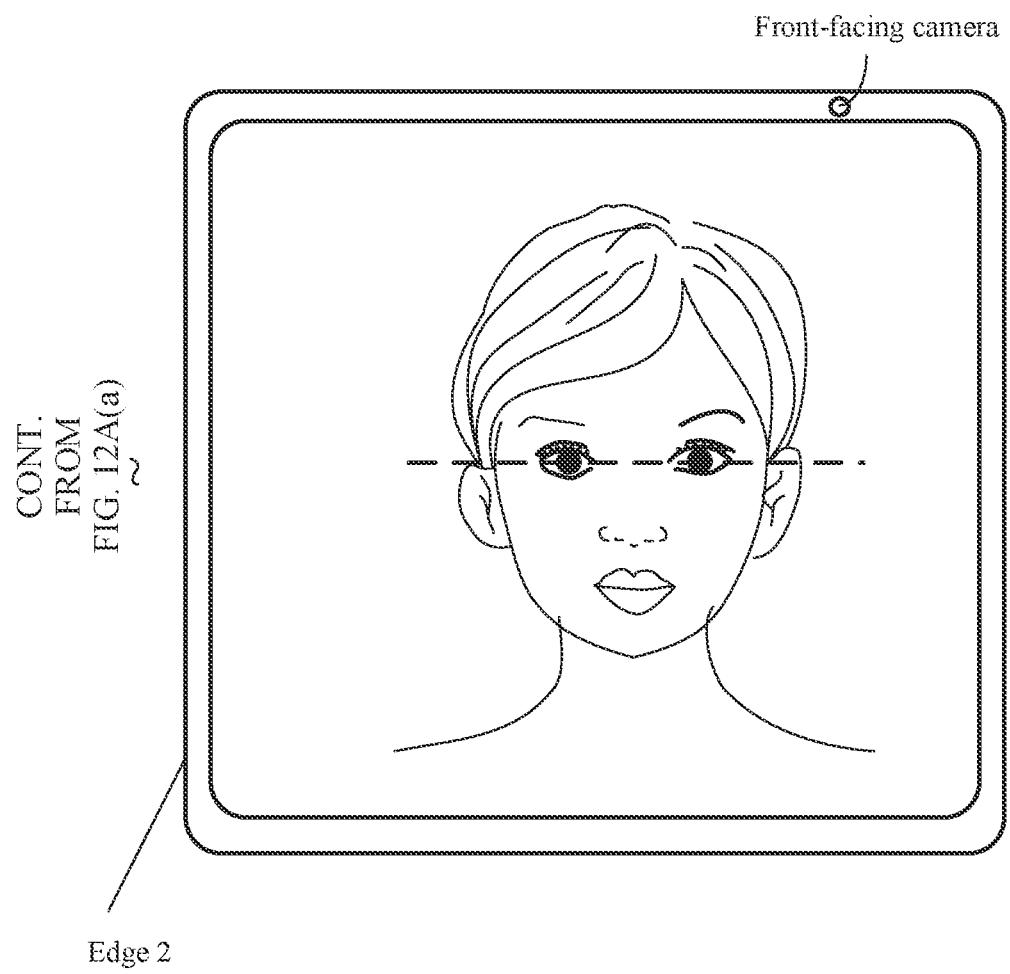

Optionally, a possible manner of determining whether the electronic device is landscape-unfolded or portrait-unfolded is as follows: As shown in FIG. 12A(*a*), a front-facing camera is disposed on the electronic device, and the electronic device starts the front-facing camera in response to changing from the folded form to the unfolded form. The front-facing camera captures an image, and the image includes a face, as shown in FIG. 12A(*b*). If the electronic device determines that a two-eye connection line on the face is perpendicular to an edge 2 or an included angle between the two-eye connection line and the edge 2 falls within a preset range, where the preset range is, for example, (60, 120), the electronic device determines that the electronic device is portrait-unfolded. The edge 2 is an unbent edge of the electronic device. It should be understood that a specific value of the preset range is not limited in this embodiment of this application.

Figure 12B:
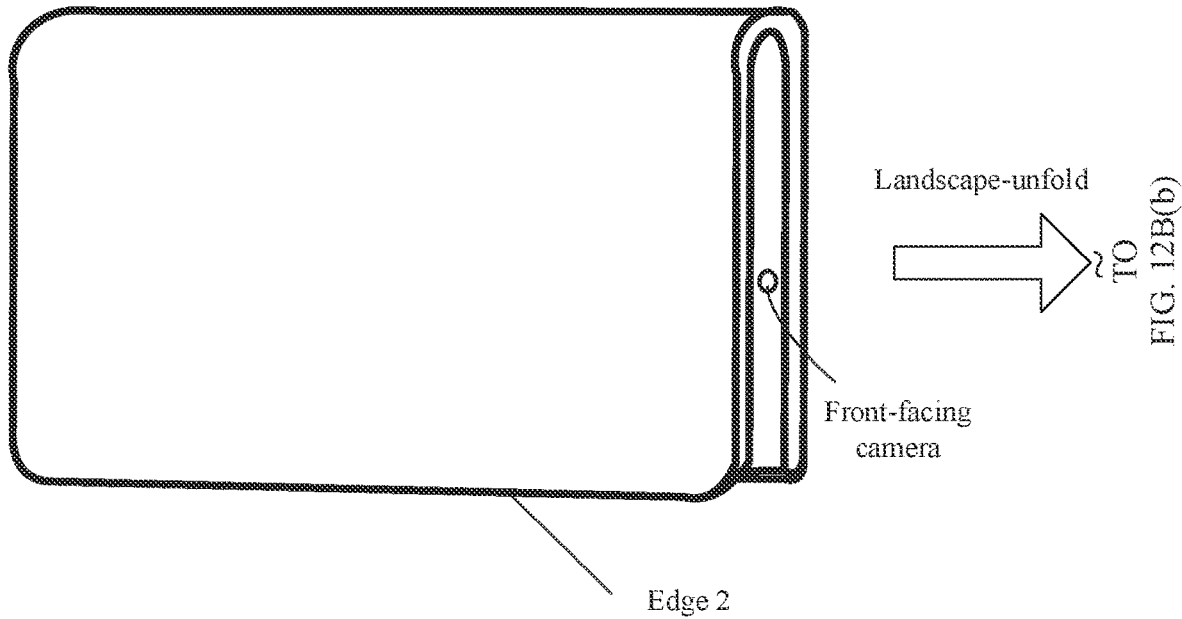
FIG. 12D(a) to FIG. 12D(c) are schematic diagrams of operating an electronic device having a foldable screen by a user according to an embodiment of this application.
Figure 12B:
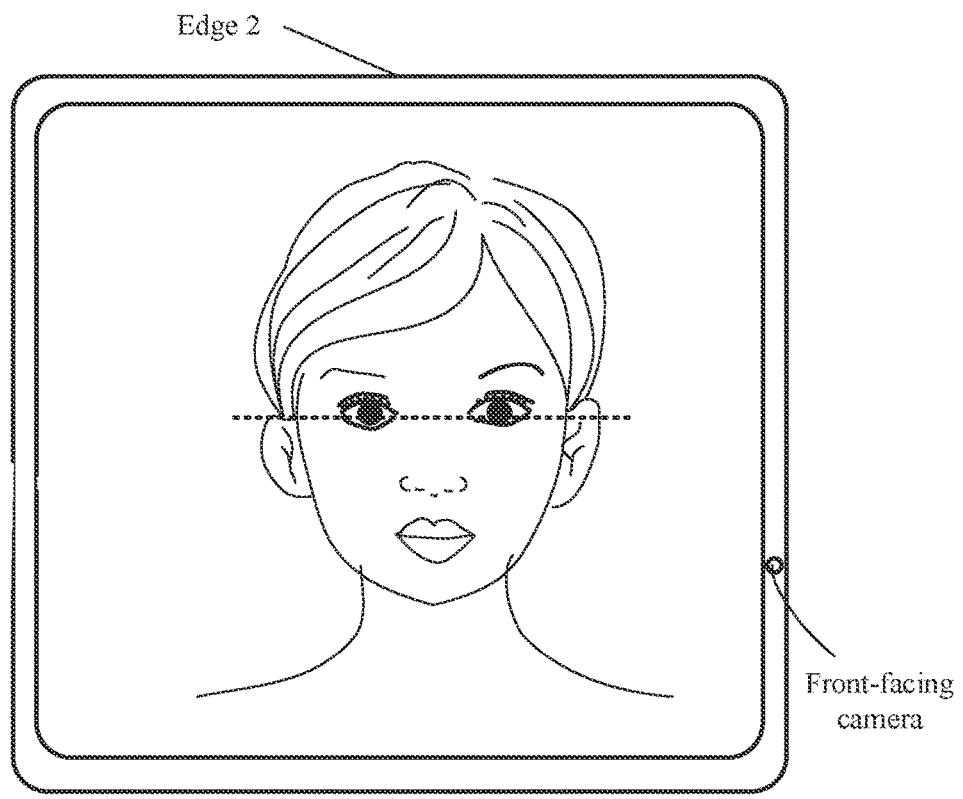

As shown in FIG. 12B(*a*), the front-facing camera is disposed on the electronic device, and the electronic device starts the front-facing camera in response to changing from the folded form to the unfolded form. The front-facing camera captures an image, and the image includes a face, as shown in FIG. 12B(*b*). When determining that a two-eye connection line on the face is parallel to the edge 2 or an included angle between the two-eye connection line and the edge 2 is not within the preset range, the electronic device determines that the electronic device is landscape-unfolded.

In some embodiments, when the electronic device is landscape-unfolded, the preset application may be directly entered. The foregoing has described the preset application. In addition, in the foregoing, the preset application is one or more solutions, and is applicable to a case of landscape unfolding. Details are not described herein again. In some other embodiments, when the electronic device is portrait-unfolded, the home screen may be entered. For example, the home screen is displayed in full screen.

Figure 12C:
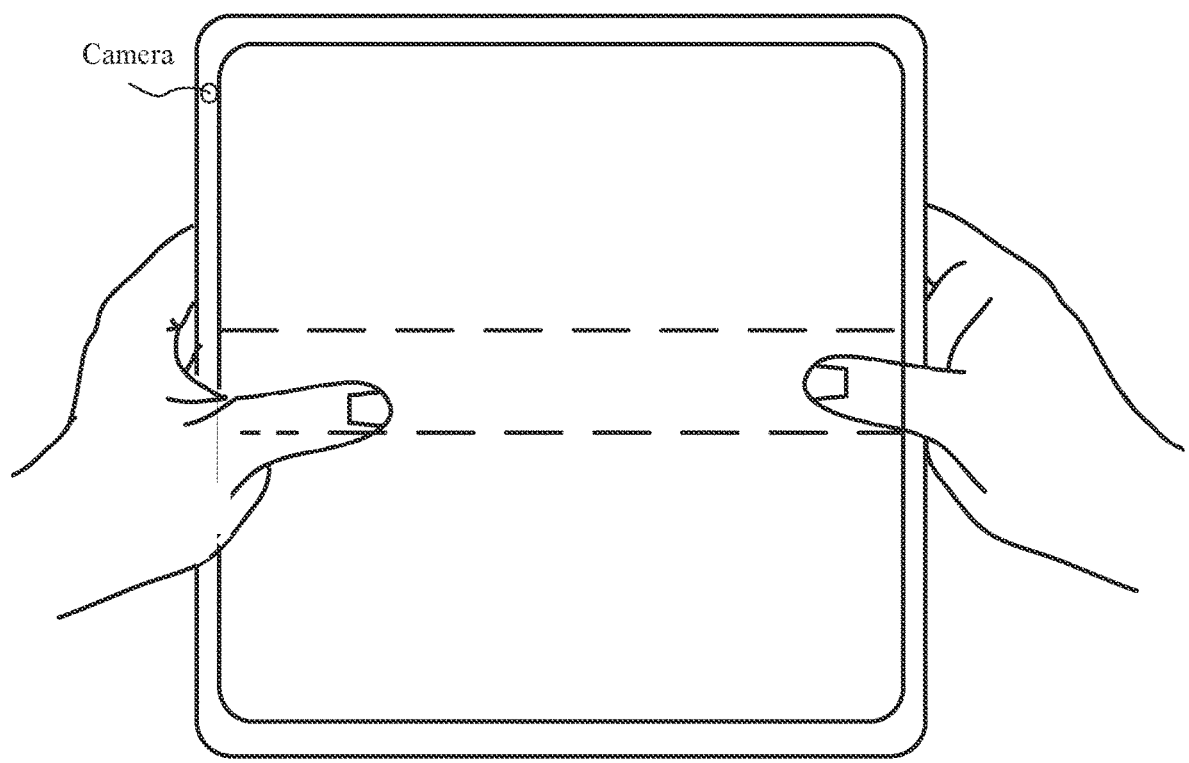
Figure 12C:
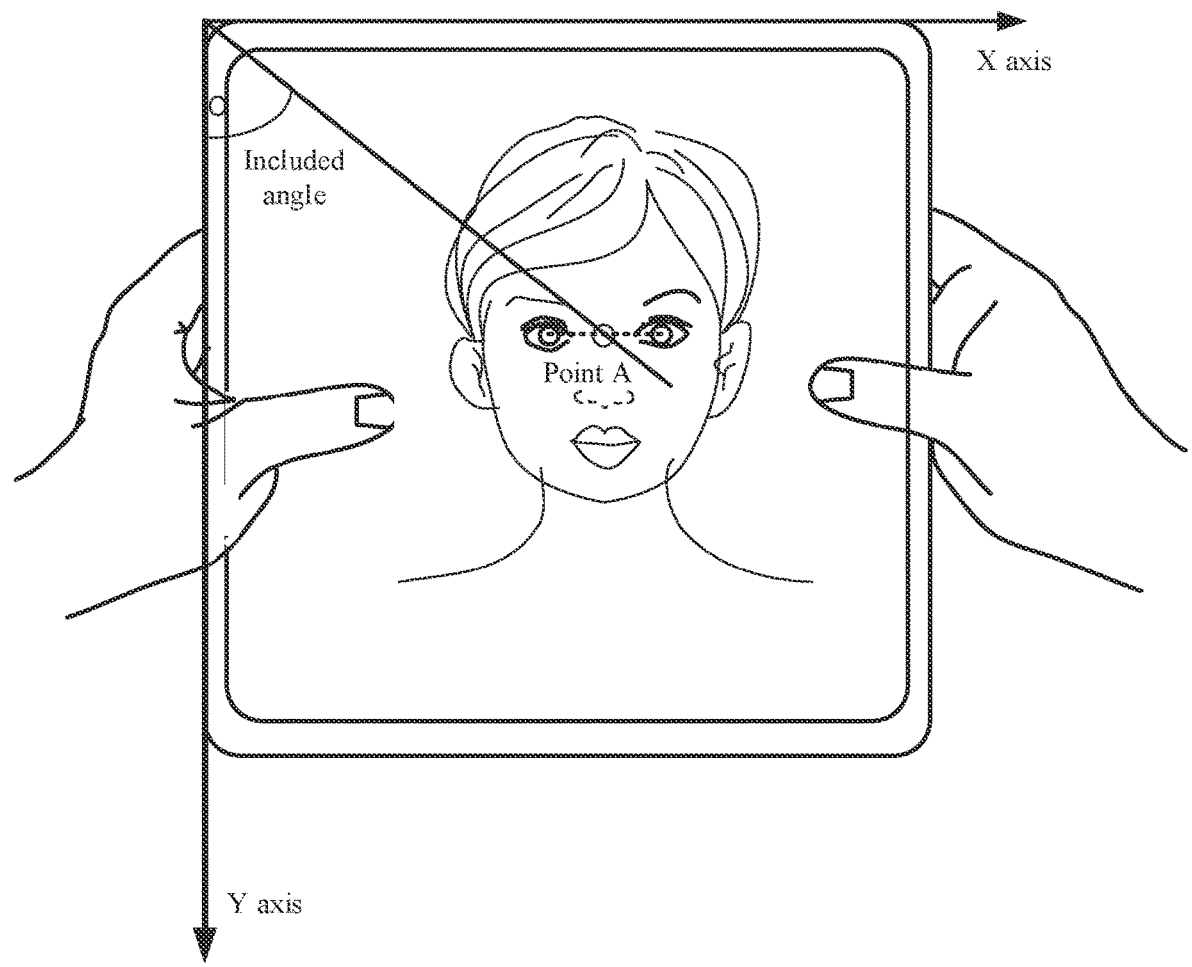

In some other embodiments, when the electronic device is landscape-unfolded, the electronic device enters the preset application again when determining that the electronic device meets a preset trigger condition. In a possible implementation, as shown in FIG. 12C(*a*), after being landscape-unfolded, the electronic device starts a camera (for example, the front-facing camera) to capture an image, where the image includes a face. The electronic device may establish a coordinate system by using an edge on which the camera is located as a Y axis, for example, an X-Y coordinate system shown in FIG. 12C(*b*). The electronic device may determine an included angle between a midpoint (for example, a point A) of a left-right-eye connection line in the image and the Y axis. If the included angle is within a preset range (which may be the same as or different from the foregoing preset range), the preset application is entered. If the included angle is not within the preset range, the home screen is displayed.

It should be understood that, after the electronic device is landscape-unfolded, if eyes in the image captured by the front-facing camera are located at a lower position in the image, the included angle between the midpoint of the eye connection line and the Y axis is relatively small. If eyes in the image captured by the front-facing camera are located at an upper or middle position in the image, the included angle between the midpoint of the eye connection line and the Y axis is relatively large. When the included angle between the midpoint of the eye connection line and the Y axis is relatively small, the electronic device may enter the home screen. When the included angle between the midpoint of the eye connection line and the Y axis is relatively large, the electronic device may enter a specific application.

Figure 12D:
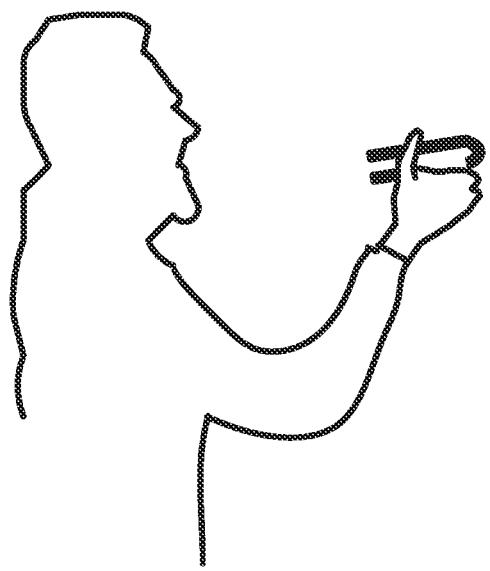
Figure 12D:
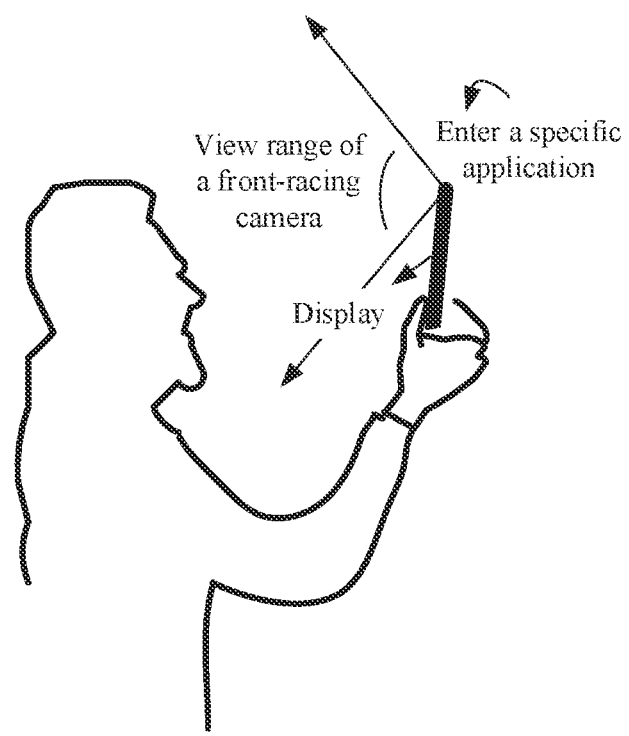
Figure 12D:
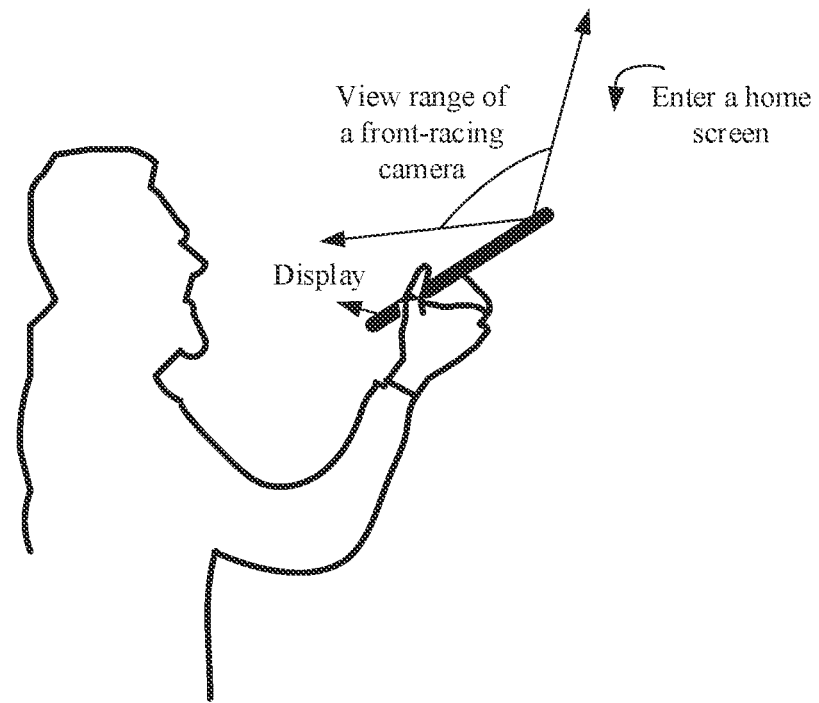

For example, as shown in FIG. 12D(a), the user holds the electronic device in the folded form in landscape mode. As shown in FIG. 12D(b), after the electronic device is horizontally unfolded, the front-facing camera on the electronic device captures an image. In this case, an area occupied by a face in the image captured by the front-facing camera is relatively large, and the face in the image is relatively centered (the face of the user relatively directly faces the display). If an angle between a midpoint of an eye connection line in the image and the Y axis is greater than a preset angle, the specific application is entered. As shown in FIG. 12D(c), after the electronic device is horizontally unfolded, the front-facing camera on the electronic device captures an image. In this case, an area occupied by a face in the image captured by the front-facing camera is relatively small (the face of the user does not face the display), and the face is at a relatively lower position in the image. If an angle between a midpoint of an eye connection line in the image and the Y axis is less than a preset angle, the home screen is entered.

In some other embodiments, after the electronic device is landscape-unfolded, if an included angle between a normal direction and a gravity direction of the display is greater than a first preset angle (for example, 90 degrees or 120 degrees), the home screen is displayed. If the included angle between the normal direction and the gravity direction of the display is less than a second preset angle (for example, 90 degrees or 60 degrees), a first preset application is entered. Alternatively, after the electronic device is landscape-unfolded, if an included angle between a normal direction and a gravity direction of the display is greater than a first preset angle (for example, 90 degrees or 120 degrees), a display interface of a first preset application is displayed. If the included angle between the normal direction and the gravity direction of the display is less than a second preset angle (for example, 90 degrees or 60 degrees), and the front-facing camera captures a face image (for example, the user operates the electronic device while lying down with the face facing the display), the home screen is entered.

Figure 13A:
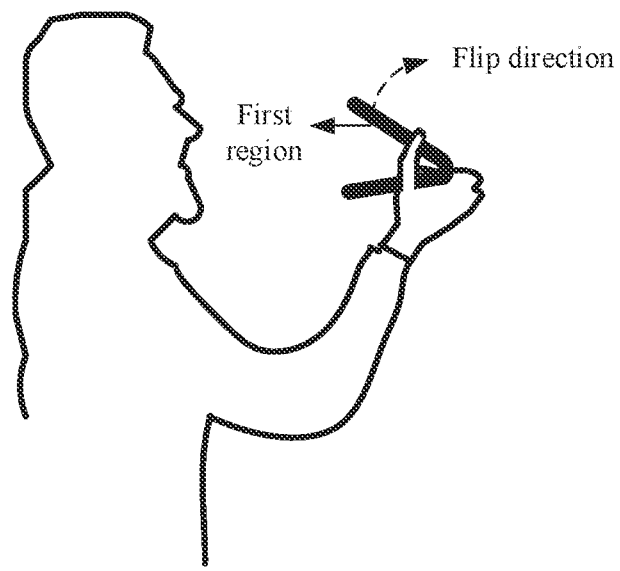
FIG. 13(a) to FIG. 14(d) are schematic diagrams of operating an electronic device having a foldable screen by a user according to an embodiment of this application.
Figure 13B:
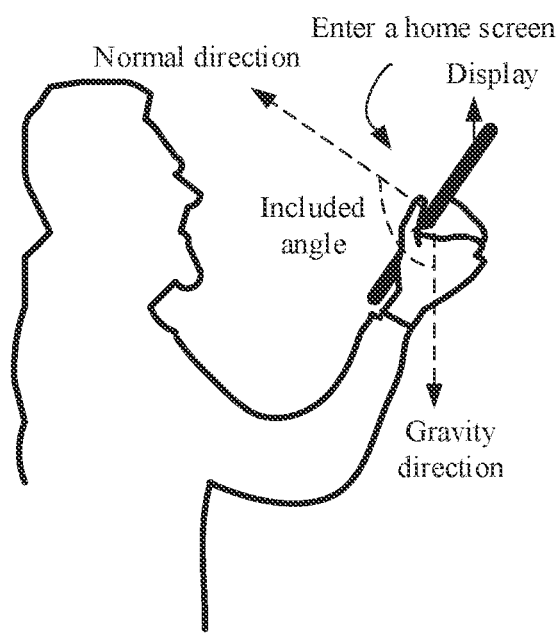
Figure 13C:
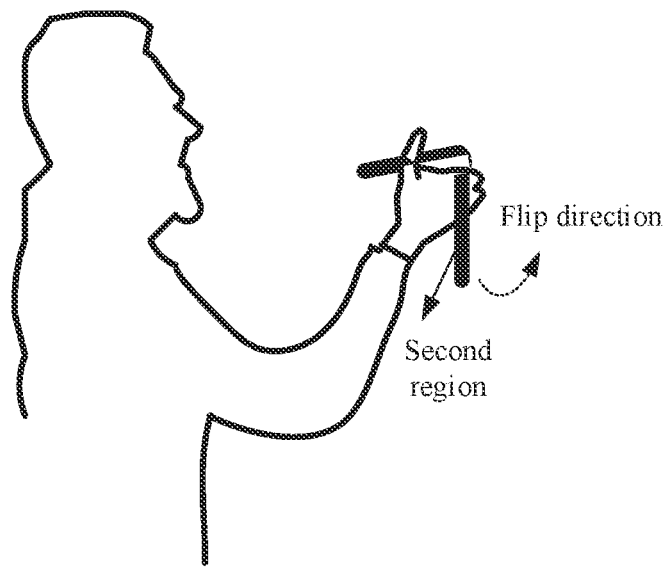
Figure 13D:
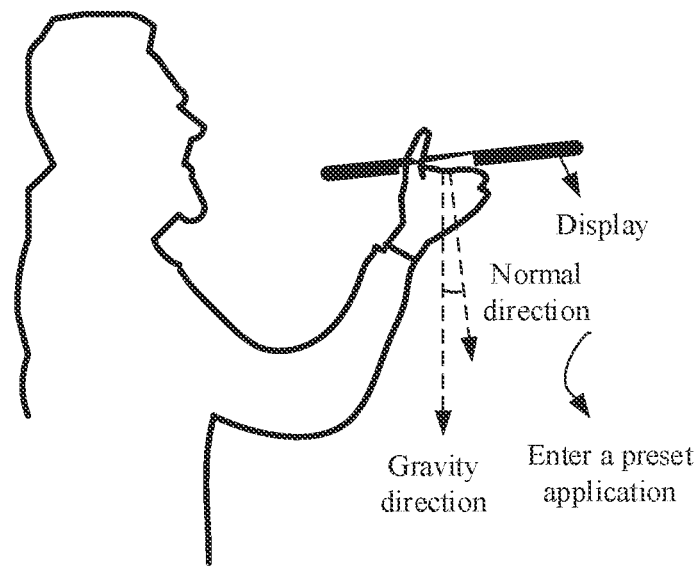

For example, as shown in FIG. 13(a), the electronic device is landscape-unfolded. For example, the first region on the foldable screen of the electronic device is flipped over (for example, by using a bent part as a center, the first region is flipped along a flip direction indicated by the dashed line in the figure). After the electronic device is unfolded, if the included angle between the normal direction and the gravity direction of the display is greater than 90 degrees, the home screen is displayed, as shown in FIG. 13(b). As shown in FIG. 13(c), the electronic device is landscape-unfolded. For example, the second region on the foldable screen of the electronic device is flipped over (for example, by using the bent part as a center, the second region is flipped along a flip direction indicated by the dashed line in the figure). After the electronic device is unfolded, the included angle between the normal direction and the gravity direction of the display is less than 90 degrees, and the electronic device enters the first preset application, for example, displays a collection and payment QR code of Huawei Pay, Alipay, or WeChat, as shown in FIG. 13(d). Alternatively, FIG. 13(d) is still used as an example. After the electronic device is unfolded, when the included angle between the normal direction and the gravity direction of the display is less than 90 degrees, and no face image is captured by the front-facing camera, the electronic device displays the collection and payment QR code of Huawei Pay, Alipay, WeChat, or the like.

In some other embodiments, after the electronic device is landscape-unfolded, if the included angle between the normal direction and the gravity direction of the display is greater than the first preset angle, a preset application 1 may be entered. If the included angle between the normal direction and the gravity direction of the display is less than the first preset angle, a preset application 2 is entered.

Figure 14A:
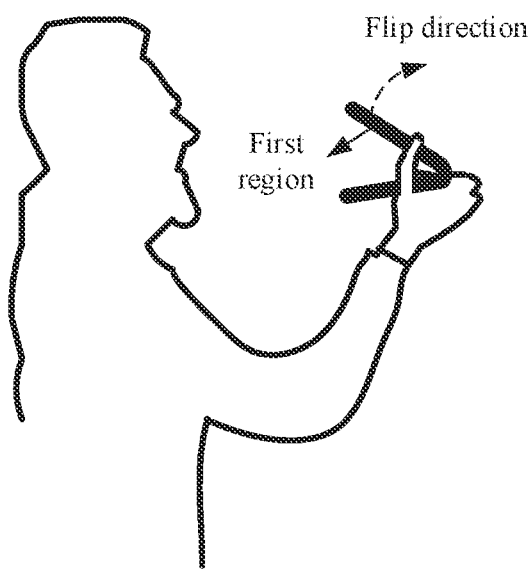
Figure 14B:
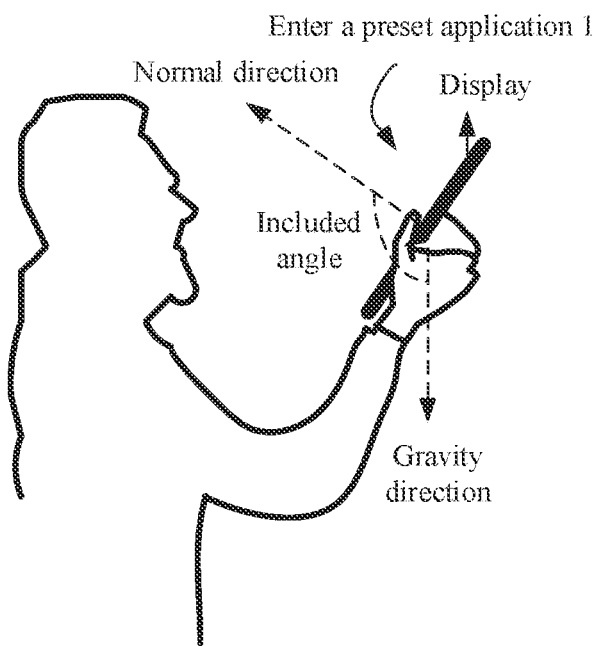
Figure 14C:
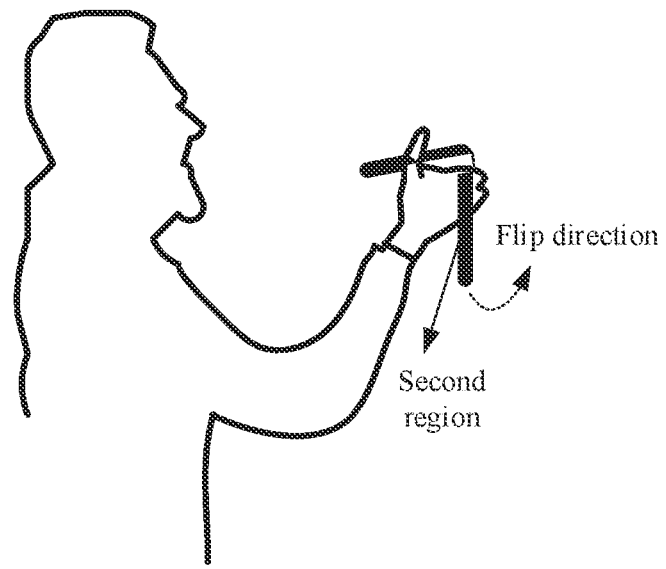

For example, as shown in FIG. 14(a), the electronic device is landscape-unfolded. For example, the first region on the foldable screen of the electronic device is flipped over (for example, by using the bent part as a center, the first region is flipped along a flip direction indicated by the dashed line in the figure). After the electronic device is unfolded, if the included angle between the normal direction and the gravity direction of the display is greater than 90 degrees, the preset application 1, for example, the iQIYI application, is entered, as shown in FIG. 14(b). As shown in FIG. 14(c), the electronic device is landscape-unfolded. For example, the second region on the foldable screen of the electronic device is flipped over (for example, by using the bent part as a center, the second region is flipped along a flip direction indicated by the dashed line in the figure). After the electronic device is unfolded, the included angle between the normal direction and the gravity direction of the display is less than 90 degrees, and no face image is captured. In this case, a display interface, for example, a collection and payment QR code, of the preset application 2 such as the Huawei Pay application, the Alipay application, or the WeChat application is entered, as shown in FIG. 14(d).

The foregoing implementations of embodiments of this application may be randomly combined to implement different technical effects.

With reference to the foregoing embodiments and related accompanying drawings, an embodiment of this application provides a method for quickly entering an application. The method may be implemented by an electronic device having a foldable screen (for example, a mobile phone having a foldable screen, or a tablet computer having a foldable screen). For example, a structure of the electronic device may be shown in FIG. 2A and FIG. 3(a) to FIG. 3(d). FIG. 3(a) to FIG. 3(d) are used as an example. The foldable screen includes a first region, a second region, and a third region. When the electronic device is in a folded form, an included angle between the first region and the second region is less than or equal to a first preset angle, and the third region is disposed between the first region and the second region. As shown in FIG. 15, the method may include the following steps.

1501: The electronic device detects a first operation, where the first operation is used to change the electronic device from the folded form to an unfolded form, and when the electronic device is in the unfolded form, the included angle between the first region and the second region is greater than a second preset angle, and the second preset angle is greater than the first preset angle.

1502: The electronic device displays display interfaces of one or more preset applications in the first region, and/or the second region, and/or the third region in response to detecting the first operation.

It should be noted that, in embodiments of this application, division into units is an example, and is merely logical function division. In actual implementation, another division manner may be used. Functional units in embodiments of the present invention may be integrated into one processing unit, or each of the units may exist alone physically, or two or more units are integrated into one unit. For example, in the foregoing embodiments, a first obtaining unit and a second obtaining unit may be a same unit or different units. The integrated unit may be implemented in a form of hardware, or may be implemented in a form of a software functional unit.

According to the context, the term "when" used in the foregoing embodiments may be interpreted as a meaning of "if". "after", "in response to determining", or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented through software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

For a purpose of explanation, the foregoing descriptions are described with reference to specific embodiments. However, the foregoing example discussion is not intended to be detailed, and is not intended to limit this application to a disclosed precise form. According to the foregoing teaching content, many modification forms and variation forms are possible. Embodiments are selected and described to fully illustrate the principles of this application and practical application of the principles, so that other persons skilled in the art can make full use of this application and various embodiments that have various modifications applicable to conceived specific usage.

What is claimed is:

1. A method comprising:
    detecting a first unfolding operation for changing an electronic device from a folded form to an unfolded form, wherein the electronic device has a foldable screen comprising a first region, a second region, and a third region, wherein a first included angle between the first region and the second region is less than a first preset angle when the electronic device is in the folded form, wherein the first region and the second region are respectively on two sides of the third region when the electronic device is in the folded form, wherein the first included angle is greater than a second preset angle when the electronic device is in the unfolded form, wherein the second preset angle is greater than the first preset angle, and wherein detecting the first unfolding operation comprises detecting the first unfolding operation for changing the electronic device from a landscape-folded form to a landscape-unfolded form or from a portrait-folded form to a portrait-unfolded form; and
    displaying display interfaces of one or more preset applications in the first region, the second region, and/or the third region when the electronic device changes from the landscape-folded form to the landscape-unfolded form and when a third included angle between a normal direction and a gravity direction of the foldable screen is within a preset range,
    wherein the one or more preset applications include applications specified for displaying, in response to detecting the first unfolding operation, by a user using a preset function or interface provided by the electronic device.

2. The method of claim 1, wherein the one or more preset applications include the most frequently used applications within a preset duration, wherein the one or more preset applications include the last run or last displayed applications before the electronic device is folded into the folded form, or wherein the one or more preset applications include applications corresponding to a new message received when the electronic device is in the folded form.

3. The method of claim 1, further comprising displaying, when the electronic device changes from the portrait-folded form to the portrait-unfolded form, a home screen in the first region, the second region, and/or the third region.

4. The method of claim 1, wherein displaying the display interfaces comprises:
    capturing, in response to detecting the first unfolding operation, an image using a front-facing camera on the electronic device;
    determining a line between a point on a face and an edge point on the electronic device when the image comprises the face;
    determining a second included angle between the line and a first edge on which the edge point is located; and
    displaying the display interfaces of the one or more preset applications in the first region, the second region, and/or the third region when the second included angle is greater than a third preset angle.

5. The method of claim 4, further comprising displaying a home screen in the first region, the second region, and/or the third region when the second included angle is less than a fourth preset angle, wherein the third preset angle is greater than the fourth preset angle.

6. The method of claim 1, further comprising displaying a home screen in the first region, the second region, and/or the third region when the third included angle is greater than a third preset angle.

7. The method of claim 1, wherein displaying the display interfaces comprises:
    displaying the display interfaces in full screen in the first region, the second region, and/or the third region; or
    entering, in response to the first unfolding operation, a split-screen mode in which a home screen is displayed in a first display region on the foldable screen, and the display interfaces are displayed in a second display region.

8. The method of claim 1, wherein displaying the display interfaces comprises:
displaying, in response to the first unfolding operation, icons of the one or more preset applications in the first region, the second region, and/or the third region; and
displaying, in response to detecting a second operation performed on a first icon of the icons, a display interface of a preset application corresponding to the first icon in full screen.

9. An electronic device comprising:
a foldable screen comprising a first region, a second region, and a third region; and
a processor coupled to the foldable screen and configured to:
detect a first unfolding operation for changing the electronic device from a folded form to an unfolded form, wherein a first included angle between the first region and the second region is less than a first preset angle when the electronic device is in the folded form, wherein the first region and the second region are respectively on two sides of the third region when the electronic device is in the folded form, wherein the first included angle is greater than a second preset angle when the electronic device is in the unfolded form, wherein the second preset angle is greater than the first preset angle, and wherein in a manner to detect the first unfolding operation, the processor is further configured to detect the first unfolding operation for changing the electronic device either from a landscape-folded form to a landscape-unfolded form or from a portrait-folded form to a portrait-unfolded form; and
display display interfaces of one or more preset applications in the first region, the second region, and/or the third region when the electronic device changes from the landscape-folded form to the landscape-unfolded form and when a third included angle between a normal direction and a gravity direction of the foldable screen is within a preset range,
wherein the one or more preset applications include applications specified for displaying, in response to detecting the first unfolding operation, by a user using a preset function or interface provided by the electronic device.

10. The electronic device of claim 9, wherein the one or more preset applications include the most frequently used applications within a preset duration, wherein the one or more preset applications include the last run or last displayed applications before the electronic device is folded into the folded form, or wherein the one or more preset applications include applications corresponding to a new message received when the electronic device is in the folded form.

11. The electronic device of claim 9, wherein the processor is further configured to display, when the electronic device changes from the portrait-folded form to the portrait-unfolded form, a home screen in the first region, the second region, and/or the third region.

12. The electronic device of claim 9, wherein the processor is further configured to:
capture, in response to detecting the first unfolding operation, an image using a front-facing camera on the electronic device;
determine a line between a point on a face and an edge point on the electronic device when the image comprises the face;
determine a second included angle between the line and a first edge on which the edge point is located; and
display the display interfaces of the one or more preset applications in the first region, the second region, and/or the third region when the second included angle is greater than a third preset angle.

13. The electronic device of claim 12, wherein the processor is configured to display a home screen in the first region, the second region, and/or the third region when the second included angle is less than a fourth preset angle, and wherein the third preset angle is greater than the fourth preset angle.

14. The electronic device of claim 9, wherein the processor is further configured to display a home screen in the first region, the second region, and/or the third region when the third included angle is greater than a third preset angle.

15. The electronic device of claim 9, wherein the processor is further configured to:
display the display interfaces in full screen in the first region, the second region, and/or the third region; or
enter, in response to the first unfolding operation, a split-screen mode in which a home screen is displayed in a first display region on the foldable screen, and the display interfaces are displayed in a second display region.

16. The electronic device of claim 9, wherein the processor is further configured to:
display, in response to the first unfolding operation, icons of the one or more preset applications in the first region, the second region, and/or the third region; and
display, in response to detecting a second operation performed on a first icon of the icons, a display interface of a preset application corresponding to the first icon in full screen.

17. A computer program product comprising instructions that are stored on a computer-readable storage medium, and that when executed by a processor, cause an electronic device to:
detect a first unfolding operation for changing the electronic device from a folded form to an unfolded form, wherein the electronic device has a foldable screen comprising a first region, a second region, and a third region, wherein an included angle between the first region and the second region is less than a first preset angle when the electronic device is in the folded form, wherein the first region and the second region are respectively on two sides of the third region when the electronic device is in the folded form, wherein the included angle is greater than a second preset angle when the electronic device is in the unfolded form, and wherein the second preset angle is greater than the first preset angle, and wherein in a manner to detect the first unfolding operation, the processor is further configured to detect the first unfolding operation for changing the electronic device either from a landscape-folded form to a landscape-unfolded form or from a portrait-folded form to a portrait-unfolded form; and
display display interfaces of one or more preset applications in the first region, the second region, and/or the third region when the electronic device changes from the landscape-folded form to the landscape-unfolded form and when a third included angle between a normal direction and a gravity direction of the foldable screen is within a preset range, wherein the one or more preset applications include applications specified for displaying, in response to detecting the first unfolding operation, by a user using a preset function or interface provided by the electronic device.

18. The computer program product of claim 17, wherein the one or more preset applications include the most frequently used applications within a preset duration.

19. The computer program product of claim 17, wherein the one or more preset applications include the last run or last displayed applications before the electronic device is folded into the folded form.

20. The computer program product of claim 17, wherein the one or more preset applications include applications corresponding to a new message received when the electronic device is in the folded form.

21. The computer program product of claim 17, wherein the instructions, when executed by the processor, further cause the electronic device to displaying a home screen in the first region, the second region, and/or the third region when the electronic device changes from the portrait-folded form to the portrait-unfolded form.

* * * * *